(12) United States Patent
Austin et al.

(10) Patent No.: US 12,436,968 B2
(45) Date of Patent: *Oct. 7, 2025

(54) DYNAMIC DATA SET MODIFICATION AND MAPPING

(71) Applicants: Christopher B. Austin, Grafton, WI (US); Shaheeb Roshan, Roscoe, IL (US)

(72) Inventors: Christopher B. Austin, Grafton, WI (US); Shaheeb Roshan, Roscoe, IL (US)

( * ) Notice: Subject to any disclaimer, the term of this patent is extended or adjusted under 35 U.S.C. 154(b) by 592 days.

This patent is subject to a terminal disclaimer.

(21) Appl. No.: 17/946,901

(22) Filed: Sep. 16, 2022

(65) Prior Publication Data
US 2023/0077956 A1 Mar. 16, 2023

Related U.S. Application Data

(63) Continuation of application No. 16/238,017, filed on Jan. 2, 2019, now Pat. No. 11,475,037, which is a (Continued)

(51) Int. Cl.
*G06F 16/26* (2019.01)
*G06F 3/0482* (2013.01)
(Continued)

(52) U.S. Cl.
CPC ............ *G06F 16/26* (2019.01); *G06F 3/0482* (2013.01); *G06F 16/00* (2019.01);
(Continued)

(58) Field of Classification Search
CPC ...... G06F 2216/11; G06F 16/26; G06F 17/40; G06F 16/00; G06F 16/2246;
(Continued)

(56) References Cited

U.S. PATENT DOCUMENTS 10,509,648 B2 * 12/2019 Rabin ................... G06F 8/77
2006/0167839 A1 * 7/2006 Lind ................ G06F 16/9027
(Continued)

OTHER PUBLICATIONS

Smith, Christopher Ravi. DataBurst: Interactive Analysis of Hierarchical Data Using Radial Space-Filling Diagrams. Diss. Dalhousie University, 2010. (Year: 2010).*

*Primary Examiner* — Jesse P Frumkin
(74) *Attorney, Agent, or Firm* — Michael Best & Friedrich LLP

(57) ABSTRACT

Systems and methods for generating a data map based on a dynamically updated data set. The system includes a client-side device. The client-side device includes a controller and is operably connected to a communication network. The controller includes a processor and a non-transitory computer readable data storage medium, the processor is configured to retrieve from the medium and execute computer readable instructions to receive a data set including one or more data assets and generate the data map based on the received data set. Each data asset includes four or more attributes. The data map includes one or more segments, and the one or more segments illustrate each of the four or more attributes of the one or more data assets.

25 Claims, 40 Drawing Sheets

Related U.S. Application Data continuation of application No. PCT/US2017/040694, filed on Jul. 5, 2017.

(60) Provisional application No. 62/514,084, filed on Jun. 2, 2017, provisional application No. 62/358,419, filed on Jul. 5, 2016.

(51) Int. Cl.
  *G06F 16/00* (2019.01)
  *G06F 16/22* (2019.01)
  *G06Q 50/18* (2012.01)
  *G06T 11/20* (2006.01)

(52) U.S. Cl.
  CPC ....... *G06F 16/2246* (2019.01); *G06Q 50/184* (2013.01); *G06T 11/206* (2013.01); *G06F 2216/11* (2013.01); *G06T 2200/24* (2013.01)

(58) Field of Classification Search
  CPC ... G06F 3/0482; G06Q 50/184; G06T 11/206; G06T 2200/24
  See application file for complete search history.

(56) References Cited

U.S. PATENT DOCUMENTS

| | | | |
|---|---|---|---|
| 2007/0005477 A1* | 1/2007 | McAtamney | G06Q 40/00 705/35 |
| 2012/0240064 A1* | 9/2012 | Ramsay | G06T 11/00 715/762 |
| 2013/0195312 A1* | 8/2013 | Hao | G06F 16/26 382/100 |
| 2014/0380219 A1* | 12/2014 | Cartan | G06F 3/0484 715/771 |
| 2015/0220535 A1* | 8/2015 | Palmer | G06F 16/34 707/749 |
| 2016/0260033 A1* | 9/2016 | Keyngnaert | G06F 17/18 |
| 2017/0122773 A1* | 5/2017 | Ho | G01D 4/002 |
| 2018/0089161 A1* | 3/2018 | Nguyen | G06F 40/18 |

* cited by examiner

Author Map Content | Advanced Map Tools | ? Help

Context (You are here)

Adjustable Mattress Technology

Actions > | Add/Modify Segment | Add/Modify Asset | ? Help

Adjustable Mattress Technology is the 'root node' of your map; the broadest category of technology. Use the form below to add a sub-segment (ie. primary sub-category) under this master category.

Click here (✏) if you would like to modify attributes of this segment itself.
Click here (✗) if you would like to delete this map entirely.

New Sub-Segment Name

Author Map Content | Advanced Map Tools | ? Help

Context (You are here)

Mattress

Actions > | Add/Modify Segment | Add/Modify Asset | ? Help

Use the form below to add a new sub-segment under: Mattress.

Click here (✎) if you would like to modify attributes of this segment itself.
Click here (✗) if you would like to delete this segment entirely.

New Sub-Segment Name

[Add Sub-Segment]

Asset Detail

Search:

| Patent # | Title | Assignee | Strength | Date |
|---|---|---|---|---|
| 6311348B1 | Bed assembly with an air mattress and controller | Hill-Rom Services, Inc. | 0.1000 | 11/06/01 |

Showing 1 to 1 of 1 entries

Author Map Content | Advanced Map Tools | ? Help

Context (You are here)

Connections and Fasteners

Actions > | Add/Modify Segment | Add/Modify Asset | ? Help

Use the form below to add a new sub-segment under: Connections and Fasteners.

Click here (✎) if you would like to modify attributes of this segment itself.
Click here (×) if you would like to delete this segment entirely.

New Sub-Segment Name

Asset Detail

Search:

| Patent # | Title | Assignee | Strength | Date |
|---|---|---|---|---|
| 20050204475A1 | Sleeping surface having two longitudinally connected bladders | Select Comfort Corporation | 0.9000 | 09/22/05 |
| 20070277325A1 | Sleeping surface having two longitudinally connected bladders with a support member | Select Comfort Corporation | 0.4000 | 12/06/07 |
| 7865988 | Sleeping surface having two longitudinally connected bladders with a support member | Select Comfort Corporation | 0.2000 | 01/11/11 |

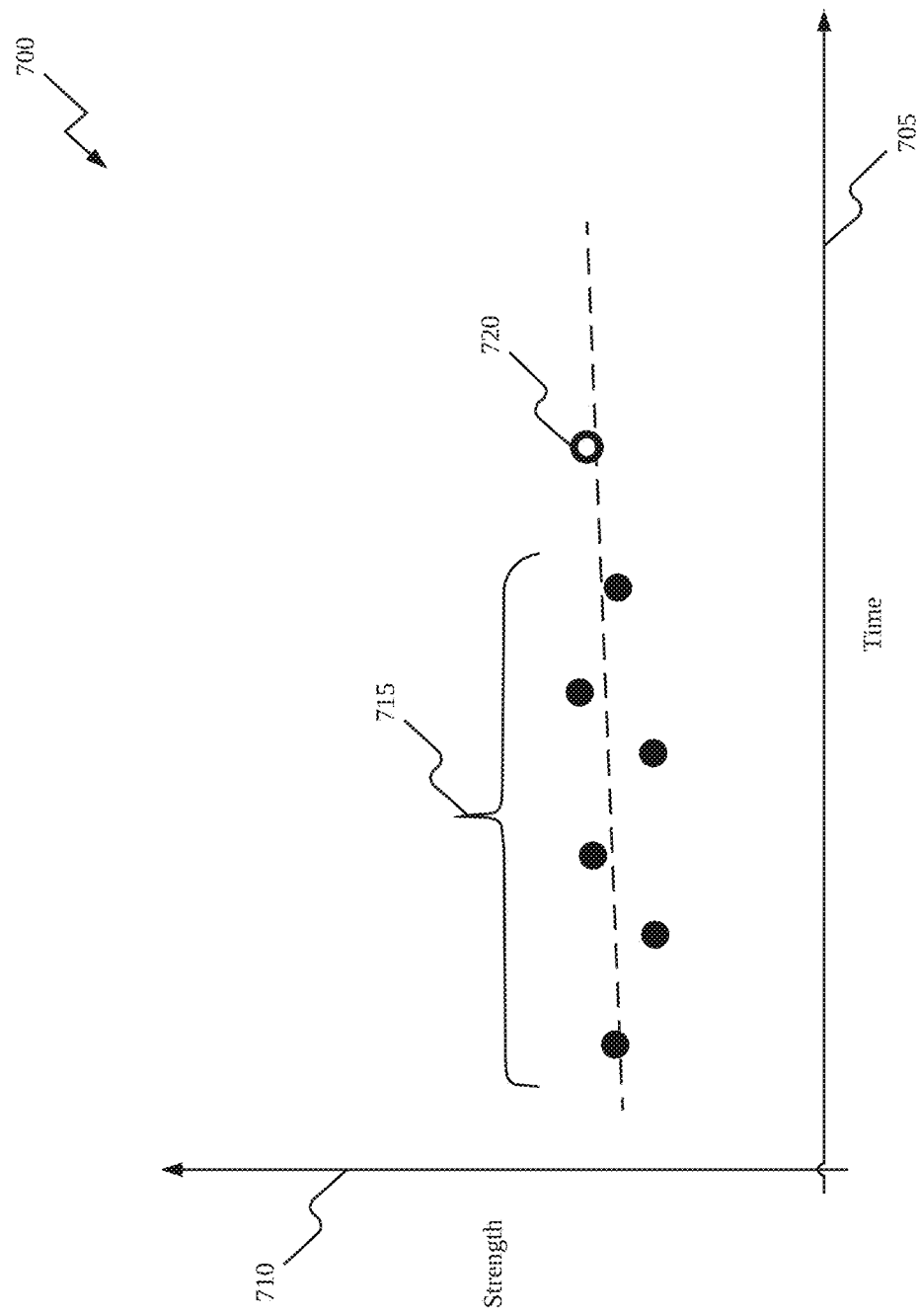

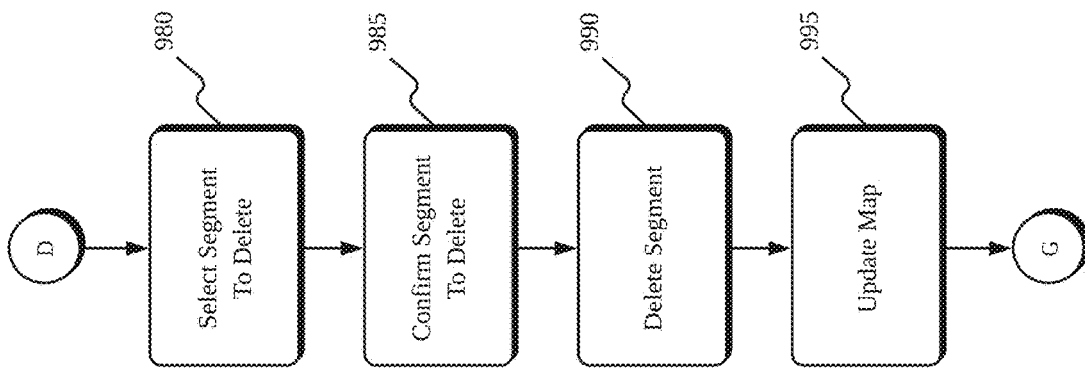
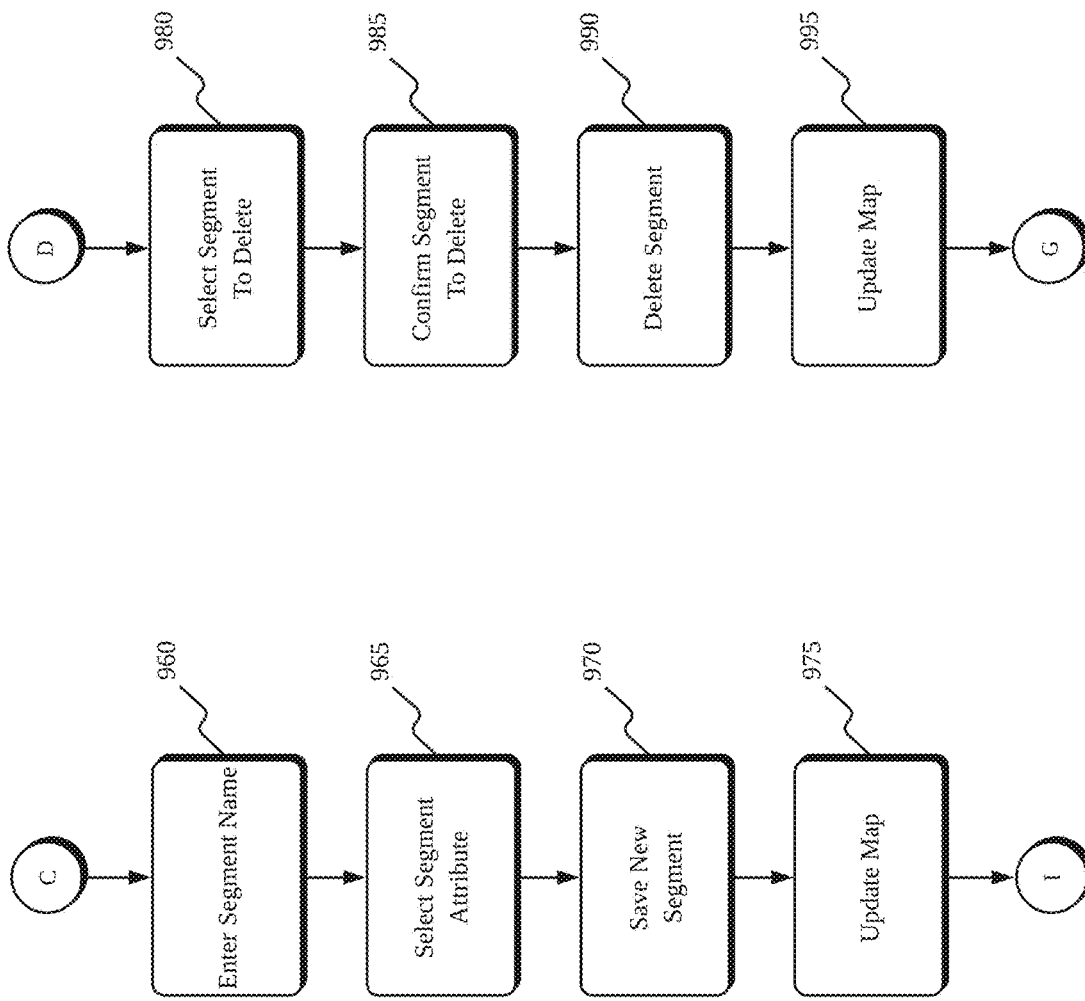
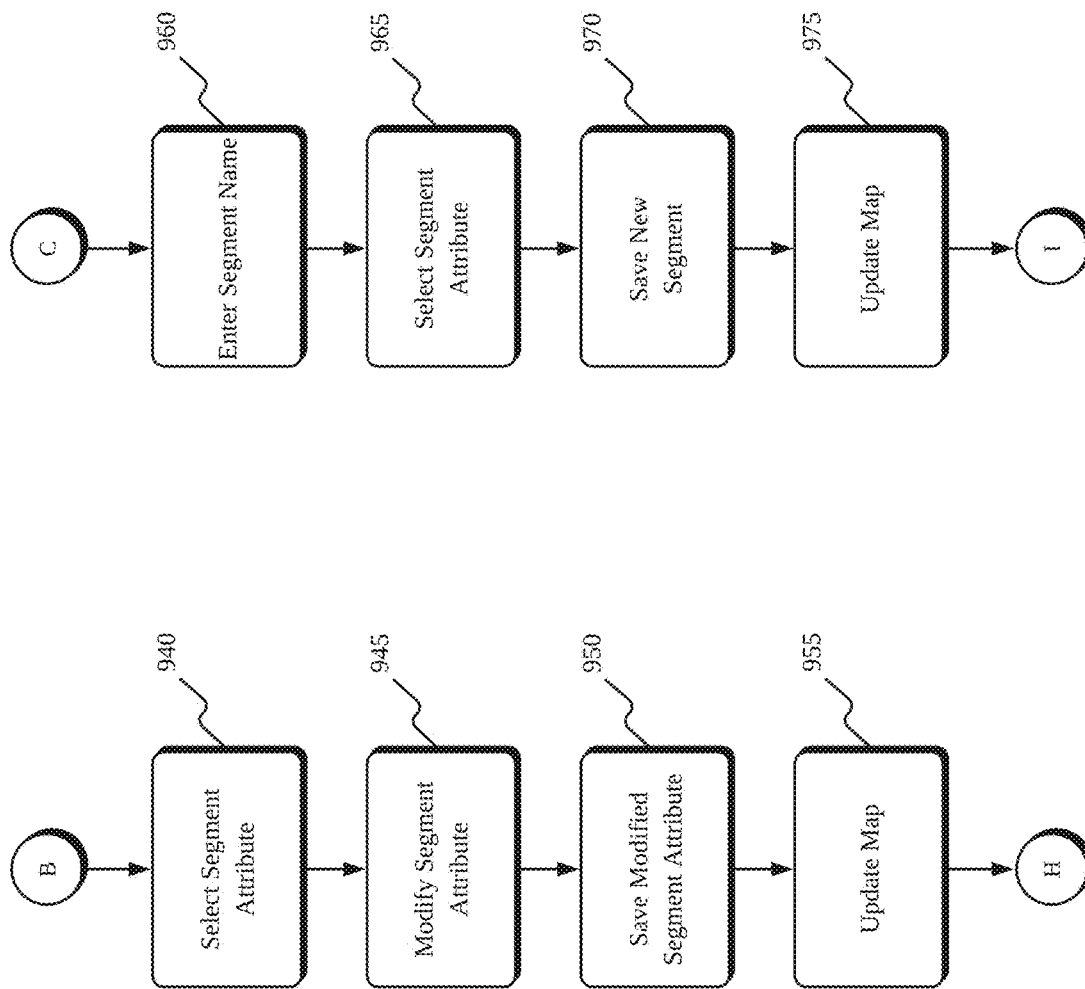

DYNAMIC DATA SET MODIFICATION AND MAPPING

RELATED APPLICATIONS

This application is a U.S. continuation application of and claims the benefit of U.S. Non-Provisional patent application Ser. No. 16/238,017 filed on Jan. 2, 2019, which is a U.S. continuation application of and claims the benefit of PCT Patent Application No. PCT/US17/40694 filed on Jul. 5, 2017, and also claims the benefit of U.S. Provisional Patent Application No. 62/358,419, filed Jul. 5, 2016, and U.S. Provisional Patent Application No. 62/514,084, filed Jun. 2, 2017, the entire contents of each of which are hereby incorporated by reference.

FIELD OF INVENTION

This invention relates to the dynamic modification of data sets on both the client side and server side of a data modification and mapping system.

SUMMARY

Information is critical to knowledge, understanding, and decision making. However, when making decisions, decision makers are often presented with too little information, such that a decision is being made based on an incomplete view of an issue, or with too much information, such that the amount of information overwhelms the issue and prevents evaluation of the issue in a meaningful way. In the modern day, the obstacle inhibiting good decision making is often the presence of too much information, not too little. The management and organization of data or information, and being able to effectively convey or present that data or information to an individual is important to evaluating and understanding an issue.

Data or information is rarely entirely unstructured. In fact, information and data can often be broken down into a hierarchical structure based on attributes or parameters. This structured or semi-structured data can be compiled into data sets and, based on the structure of the data, represented meaningfully as a map (e.g., a radial map) of the data. A master or parent data set containing all of the data for a given map can be dynamically modified based on, for example, user modifications to the map, data added to the map, multi-map data set compilation, etc. By dynamically modifying data sets and allocating data processing of certain tasks to either the client-side or the server-side of a data manipulation and mapping system, the operation of both the server-side and the client-side can be improved, as well as the effectiveness of the mapped data sets. For example, by pushing some data processing from the server-side to the client-side, the server is capable of handling additional traffic or running more computationally expensive programs based on data received back from the client-side. Additionally, by dynamically modifying data sets on the client-side, the client device limits the amount of data (e.g., as a subset of the master data set) that the client device needs to process to generate a map based on the data set. As a result, a robust dynamic mapping of data sets is achieved from a client-side device with relatively limited processing capability (e.g., a smartphone, a tablet, etc.).

After a data set has been generated or selected, the structured data within the data set is used to generate a hierarchical map that represents the data using, for example, four or more dimensions of information. Each dimension provides meaningful information to a user to assist the user in understanding the data set and the data contained within the data set. For example, a radial data map can be used to meaningfully represent data assets based on relative positions of the data assets within a given radial segment of the map. The segment of the map itself represents a first dimension of the map and illustrates the segment's place in a given hierarchical structure, as well as the number of additional segments at the same layer of the hierarchical structure. The shape (e.g., as a square, a circle, a triangle, etc.) and color (e.g., red, green, blue, etc.) of an asset as represented in the segment represent second and third dimensions of the map and illustrates the type and/or a property of data asset that is present in the segment. The radial positioning of the data asset within a given segment represents a fourth dimension of the map. In some embodiments, the radial positioning of the data asset represents a relative age of the data asset, a relative importance of the asset, etc. The positioning of the data asset circumferentially along the segment arc represents a fifth dimension of the map. In some embodiments, the positioning of the data asset along the segment arc represents a relative age of the data asset, a relative importance of the asset, etc.

In one embodiment, the invention provides a system for generating a data map based on a dynamically updated data set. The system includes a database and a server. The server includes a controller and is operably connected to a communication network. The controller includes a processor and a non-transitory computer readable data storage medium. The processor is configured to retrieve from the medium and execute computer readable instructions to retrieve a data set from the database, transmit the data set to a client-side device over the communication network, receive a modified data set from the client-side device over the communication network, and store the modified data set from the client-side device in the database. The data set includes one or more data assets and each data asset includes four or more attributes. The data map is generated based on the retrieved data set.

In another embodiment, the invention provides a system for generating a data map based on a dynamically updated data set. The system includes a client-side device. The client-side device includes a controller and is operably connected to a communication network. The controller includes a processor and a non-transitory computer readable data storage medium. The processor is configured to retrieve from the medium and execute computer readable instructions to receive a data set including one or more data assets and generate a dynamic data map based on the received data set. Each data asset includes four or more attributes. The dynamic data map includes one or more segments, and the one or more segments illustrate each of the four or more attributes of the one or more data assets. The processor is also configured to retrieve from the medium and execute computer readable instructions to select one or more of the one or more segments of the dynamic data map and limit a set of data assets loaded into an active memory of the controller to the data assets associated with the selected one or more of the one or more segments of the dynamic data map.

In another embodiment, the invention provides a system for generating a data map based on a dynamically updated data set. The system includes a client-side device. The client-side device includes a controller and is operably connected to a communication network. The controller includes a processor and a non-transitory computer readable data storage medium, the processor is configured to retrieve from the medium and execute computer readable instructions to receive a data set including one or more data assets and generate the data map based on the received data set. Each data asset includes four or more attributes. The data map includes one or more segments, and the one or more segments illustrate each of the four or more attributes of the one or more data assets.

In another embodiment, the invention provides a system for generating a data map based on a dynamically updated data set. The system includes a database, a server, and a client-side device. The server includes a first controller and is operably connected to a communication network. The first controller includes a first processor and a first non-transitory computer readable data storage medium. The first processor is configured to retrieve from the first medium and execute computer readable instructions to, retrieve a data set from the database, transmit the data set to a client-side device over the communication network, receive a modified data set from the client-side device, and store the modified data set from the client-side device in the database. The data set includes one or more data assets, and each data asset including four or more attributes. The client-side device includes a second controller and is operably connected to the communication network. The second controller includes a second processor and a second non-transitory computer readable data storage medium. The second processor is configured to retrieve from the second medium and execute computer readable instructions to receive the data set including one or more data assets from the server and generate a dynamic data map based on the received data set. The dynamic data map includes one or more segments. The one or more segments illustrate each of the four or more attributes of the one or more data assets. The second processor is also configured to retrieve from the second medium and execute computer readable instructions to select one or more of the one or more segments of the dynamic data map, and limit a set of data assets loaded into an active memory of the second controller to the data assets associated with the selected one or more of the one or more segments of the dynamic data map.

In another embodiment, the invention provides a method of generating a data map based on a dynamically updated data set. The method includes retrieving a data set from a database, transmitting the data set to a client-side device over a communication network, receiving a modified data set from the client-side device, and storing the modified data set from the client-side device in the database. The data set includes one or more data assets, and each data asset includes four or more attributes.

In another embodiment, the invention provides a method of generating a data map based on a dynamically updated data set. The method includes receiving a data set including one or more data assets and generating the data map based on the received data set. Each data asset includes four or more attributes. The data map includes one or more segments, and the one or more segments illustrate each of the four or more attributes of the one or more data assets.

Before any embodiments of the invention are explained in detail, it is to be understood that the invention is not limited in its application to the details of the configuration and arrangement of components set forth in the following description or illustrated in the accompanying drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components.

Other aspects of the invention will become apparent by consideration of the detailed description and accompanying drawings.

BRIEF DESCRIPTION OF THE DRAWINGS

FIG. 5B illustrates a client-side dynamic mapping interface for adding or modifying the dynamic data map of FIG. 5A.

FIG. 6B illustrates a client-side dynamic mapping interface for adding or modifying the dynamic data map of FIG. 6A as well as information related to data assets within the selected segment of FIG. 6A.

FIG. 7B illustrates a client-side dynamic mapping interface for adding or modifying the dynamic data map of FIG. 7A as well as information related to data assets within the selected segment of FIG. 7A.

FIG. 8B illustrates a client-side dynamic mapping interface for adding or modifying the dynamic data map of FIG. 8A as well as information related to data assets within the selected segment of FIG. 8A.

FIG. 9B illustrates a client-side dynamic mapping interface for adding or modifying the dynamic data map of FIG. 9A as well as information related to data assets within the selected segment of FIG. 9A.

FIG. 12E illustrates a client-side dynamic mapping interface for modifying dimensions of information associated with the selected data asset within the dynamic data map of FIG. 12D.

FIG. 14 illustrates a predictive map including a predicted future asset.

FIGS. 16A-16F are a process for creating and modifying an asset map.

DETAILED DESCRIPTION

Figure 1:
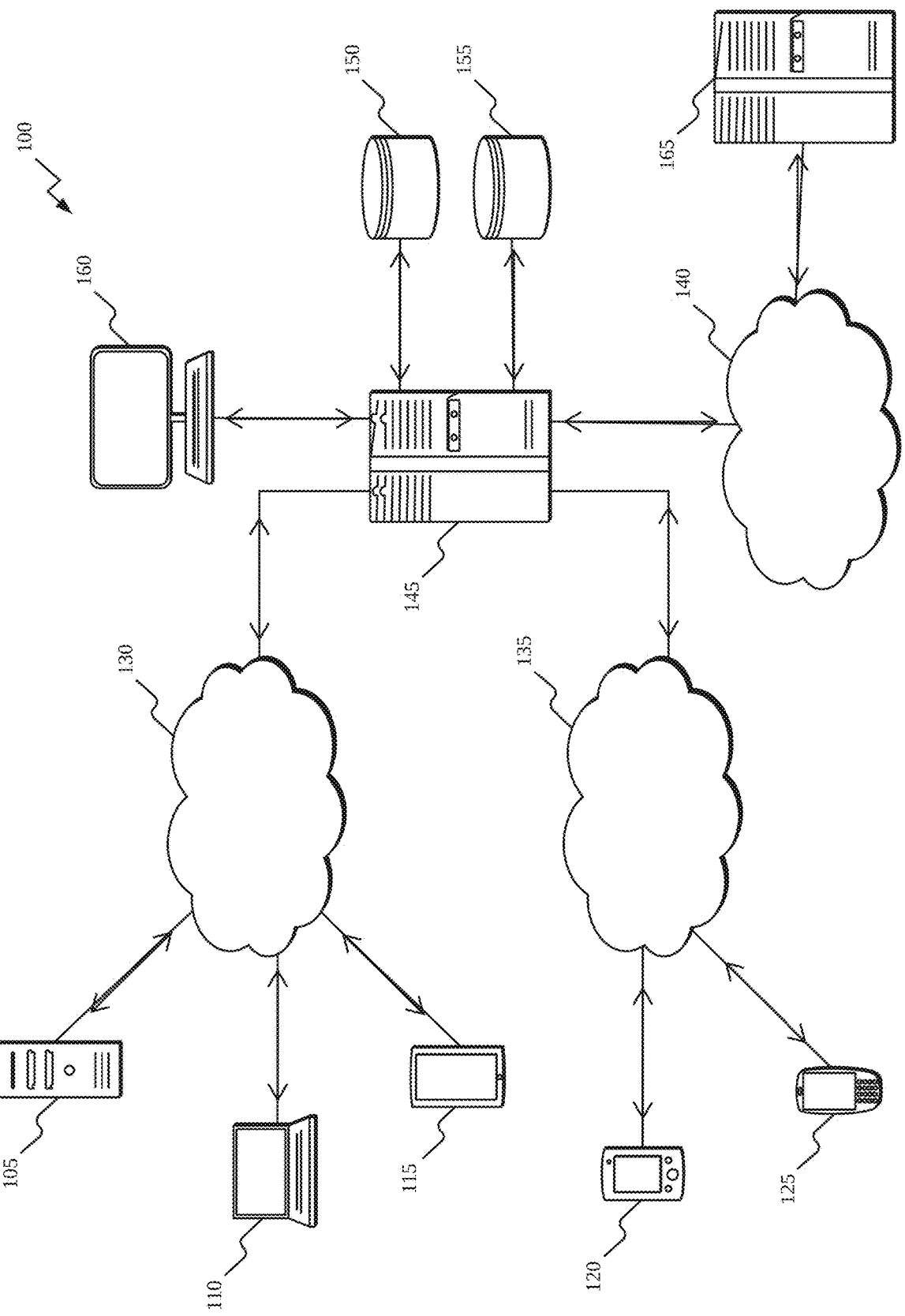
FIG. 1 illustrates a data system according to an embodiment of the invention.

FIG. 1 illustrates a data modification and mapping system 100 that is operable or configured to receive, store, generate, and dynamically modify data sets in order to generate a visual representation of the data set based on a hierarchical data structure of the data set. The data modification and mapping system 100 includes a plurality of client-side devices 105-125, a first network 130, a second network 135, a third network 140, a server-side mainframe computer or server 145, a first database 150, a second database 155, a server-side computer or workstation 160, and a third-party computing or storage device 165 (e.g., a server, a workstation, etc.). The plurality of client-side data input devices 105-125 include, for example, a server 105, a personal computer 110, a tablet computer 115, a personal digital assistant ("PDA") (e.g., an iPod touch, an e-reader, etc.) 120, and a mobile phone (e.g., a smart phone) 125. Each of the devices 105-125 is operable or configured to communicatively connect to the server 145 through the first network 130 and/or the second network 135 and receive a data set to be mapped from the server 145 or provide modified data sets to the server 145. The data sets can be received from the databases 150, 155 or provided to the databases 150, 155.

The first network 130 is, for example, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. The second network 135 is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, a Digital Enhanced Cordless Telecommunications ("DECT") network, a Digital AMPS ("IS-136/TDMA") network, or an Integrated Digital Enhanced Network ("iDEN") network, etc.

The connections between the devices 105-125 and the first and second networks 130 and 135 are, for example, wired connections, wireless connections, or a combination of wireless and wired connections. Similarly, the connections between the server 145 and the first and second networks 130 and 135 are wired connections, wireless connections, or a combination of wireless and wired connections. In the illustrated embodiment, the first network 130, the second network 135, and the communication between the devices 105-125 and the server 145 are protected using one or more encryption techniques, such as those techniques provided in the IEEE 802.1 standard for port-based network security, pre-shared key, Extensible Authentication Protocol ("EAP"), Wired Equivalency Privacy ("WEP"), Temporal Key Integrity Protocol ("TKIP"), Wi-Fi Protected Access ("WPA"), etc.

The third network 140 is, for example, a WAN (e.g., a TCP/IP based network), a LAN, a NAN, a HAN, a PAN employing any of a variety of communications protocols, such as Wi-Fi, Bluetooth, ZigBee, etc., or a cellular network, such as, for example, a GSM network, a GPRS network, a CDMA network, an EV-DO network, an EDGE network, a 3GSM network, a 4GSM network, a 4G LTE network, a DECT network, am IS-136/TDMA network, an iDEN network, etc. The server 145 connects to the device 165 through the third network 140 for accessing or receiving data from the device 165. The server 145 can store the data accessed or received from the device 165 and use the data to create and/or modify data sets.

Figure 2:
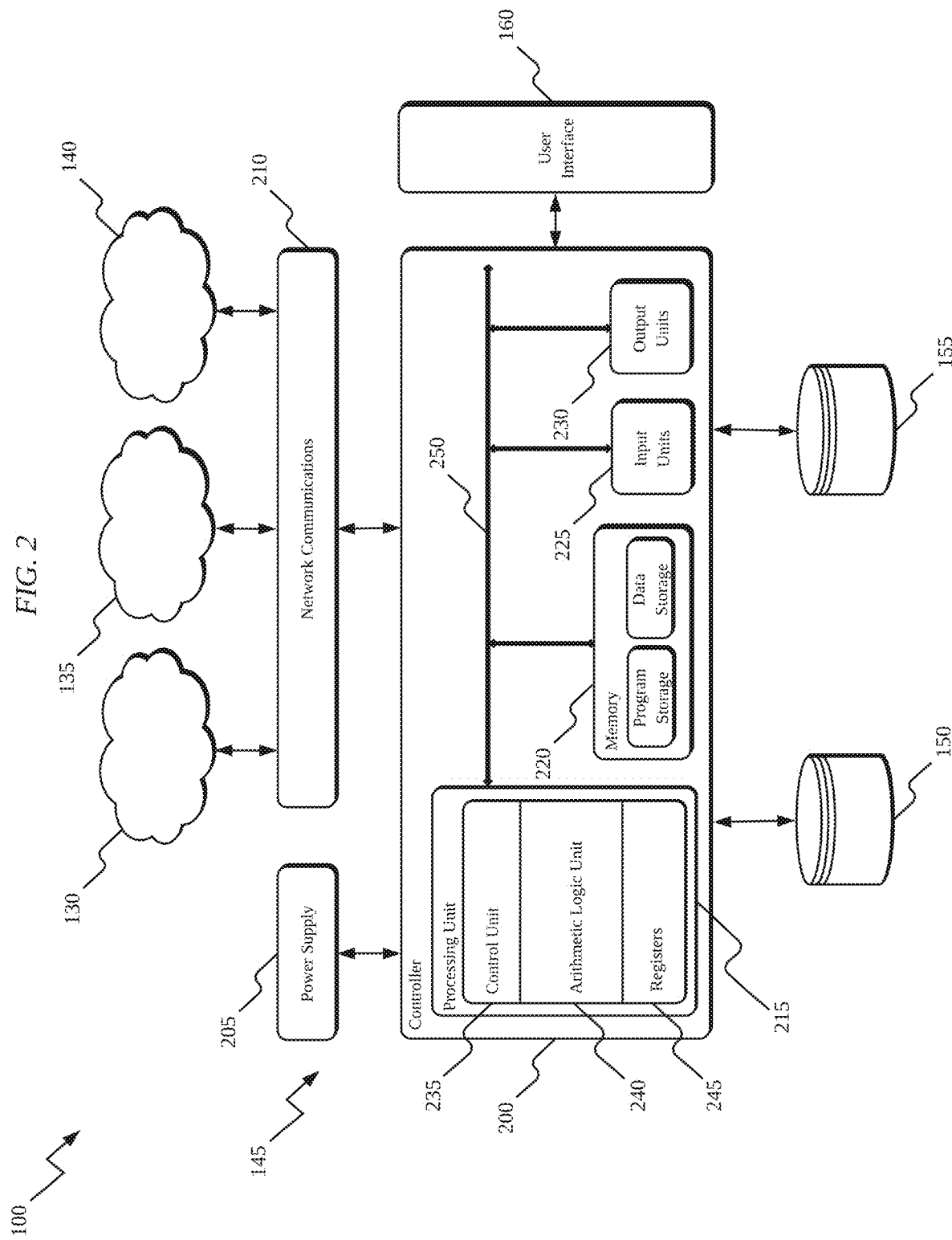
FIG. 2 illustrates a server-side processing device according to an embodiment of the invention.

FIG. 2 illustrates the server-side of the data modification and mapping system 100 with respect to the server 145. The server 145 is electrically and/or communicatively connected to a variety of modules or components of the system 100. For example, the illustrated server 145 is connected to the user interface module 160, the first database 150, and the second database 155. The server 145 includes a controller 200, a power supply module 205, and a network communications module 210. The controller 200 includes combinations of hardware and software that are operable to, among other things, dynamically modify data sets on the server side of the data modification and mapping system 100. In some constructions, the controller 200 includes a plurality of electrical and electronic components that provide power, operational control, and protection to the components and modules within the controller 200 and/or data modification and mapping system 100. For example, the controller 200 includes, among other things, a processing unit 215 (e.g., a microprocessor, a microcontroller, or another suitable programmable device), a memory 220, input units 225, and output units 230. The processing unit 215 includes, among other things, a control unit 235, an arithmetic logic unit ("ALU") 240, and a plurality of registers 245 (shown is a group of registers in FIG. 2) and is implemented using a known computer architecture, such as a modified Harvard architecture, a von Neumann architecture, etc. The processing unit 215, the memory 220, the input units 225, and the output units 230, as well as the various modules connected to the controller 200 are connected by one or more control and/or data buses (e.g., common bus 250). The control and/or data buses are shown schematically in FIG. 2 for illustrative purposes. The use of one or more control and/or data buses for the interconnection between and communication among the various modules and components would be known to a person skilled in the art in view of the invention described herein.

The memory 220 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. The processing unit 215 is connected to the memory 220 and executes software instructions that are capable of being stored in a RAM of the memory 220 (e.g., during execution), a ROM of the memory 220 (e.g., on a generally permanent basis), or another non-transitory computer readable data storage medium such as another memory or a disc.

In some embodiments, the controller 200 or network communications module 210 includes one or more communications ports (e.g., Ethernet, serial advanced technology attachment ["SATA"], universal serial bus ["USB"], integrated drive electronics ["IDE"], etc.) for transferring, receiving, or storing data associated with the system 100 or the operation of the system 100. Software included in the implementation of the system 100 can be stored in the memory 220 of the controller 200. The software includes, for example, firmware, one or more applications, program data, filters, rules, one or more program modules, and other executable instructions. The controller 200 is configured to retrieve from memory and execute, among other things, instructions related to the dynamic data modification processes and methods described herein. In other constructions, the controller 200 includes additional, fewer, or different components.

The power supply module 205 supplies a nominal AC or DC voltage to the controller 200 or other components or modules of the system 100. The power supply module 205 is powered by, for example, mains power having nominal line voltages between 100V and 240V AC and frequencies of approximately 50-60 Hz. The power supply module 205 is also operable or configured to supply lower voltages to operate circuits and components within the controller 200 or system 100. In other constructions, the controller 200 or other components and modules within the system 100 are powered by one or more batteries or battery packs, or another grid-independent power source (e.g., a generator, a solar panel, etc.).

The user interface module 160 includes a combination of digital and analog input or output devices required to achieve a desired level of control and monitoring for the system 100. For example, the user interface module 160 includes a display (e.g., a primary display, a secondary display, etc.) and input devices such as touch-screen displays, a plurality of knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, or the like.

Figure 3:
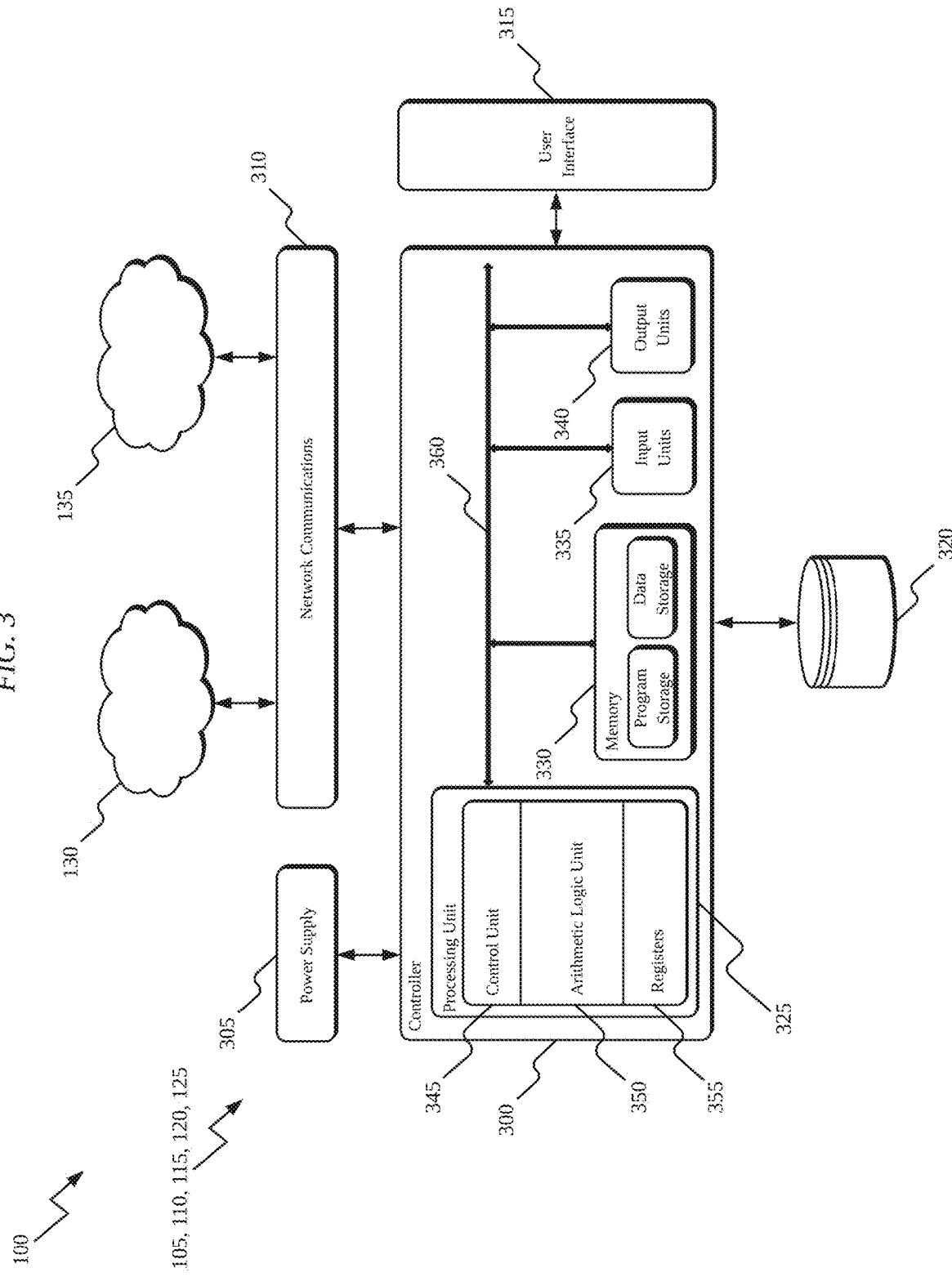
FIG. 3 illustrates a client-side processing device according to an embodiment of the invention.

FIG. 3 illustrates the client-side of the data modification and mapping system 100 with respect to the client-side devices 105-125. The client-side devices 105-125 include a controller 300, a power supply module 305, a network communications module 310, a user interface 315, and a client-side database 320. The controller 300 includes combinations of hardware and software that are operable to, among other things, dynamically modify data sets on the client side of the data modification and mapping system 100. In some constructions, the controller 300 includes a plurality of electrical and electronic components that provide power, operational control, and protection to the components and modules within the controller 300 and/or data modification and mapping system 100. For example, the controller 300 includes, among other things, a processing unit 325 (e.g., a microprocessor, a microcontroller, or another suitable programmable device), a memory 330, input units 335, and output units 340. The processing unit 325 includes, among other things, a control unit 345, an arithmetic logic unit ("ALU") 350, and a plurality of registers 355 (shown is a group of registers in FIG. 3) and is implemented using a known computer architecture, such as a modified Harvard architecture, a von Neumann architecture, etc. The processing unit 325, the memory 330, the input units 335, and the output units 340, as well as the various modules connected to the controller 300 are connected by one or more control and/or data buses (e.g., common bus 360). The control and/or data buses are shown schematically in FIG. 3 for illustrative purposes. The use of one or more control and/or data buses for the interconnection between and communication among the various modules and components would be known to a person skilled in the art in view of the invention described herein.

The memory 330 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. The processing unit 325 is connected to the memory 330 and executes software instructions that are capable of being stored in a RAM of the memory 330 (e.g., during execution), a ROM of the memory 330 (e.g., on a generally permanent basis), or another non-transitory computer readable data storage medium such as another memory or a disc.

In some embodiments, the controller 300 or network communications module 310 includes one or more communications ports (e.g., Ethernet, serial advanced technology attachment ["SATA"], universal serial bus ["USB"], integrated drive electronics ["IDE"], etc.) for transferring, receiving, or storing data associated with the system 100 or the operation of the system 100. Software included in the implementation of the system 100 can be stored in the memory 330 of the controller 300. The software includes, for example, firmware, one or more applications, program data, filters, rules, one or more program modules, and other executable instructions. The controller 300 is configured to retrieve from memory and execute, among other things, instructions related to the dynamic data modification processes and methods described herein. In other constructions, the controller 300 includes additional, fewer, or different components.

The power supply module 305 supplies a nominal AC or DC voltage to the controller 300 or other components or modules of the system 100. The power supply module 305 is powered by, for example, mains power having nominal line voltages between 100V and 240V AC and frequencies of approximately 50-60 Hz. The power supply module 305 is also operable or configured to supply lower voltages to operate circuits and components within the controller 300 or system 100. In other constructions, the controller 300 or other components and modules within the system 100 are powered by one or more batteries or battery packs, or another grid-independent power source (e.g., a generator, a solar panel, etc.).

The user interface module 315 includes a combination of digital and analog input or output devices required to achieve a desired level of control and monitoring for the system 100. For example, the user interface module 315 includes a display (e.g., a primary display, a secondary display, etc.) and input devices such as touch-screen displays, a plurality of knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, or the like.

The server 145 interacts over the networks 130, 135 with the various client-side devices 105-125 to allow the client-side devices to generate dynamic data maps based on data sets provided by the server 145. For example, for a given map, the server 145 provides all of the data to the client devices 105-125 related to that map (e.g., objects or segments of the data map, attributes of each object and asset, etc.). The server 145 provides this master or parent data set to the client device and allocates the modification and generation of new or different data sets based on the master or parent data set to the client device 105-125. Any additions or modification to the master or parent data set (e.g., including the generation of additional data subsets) can be provided from the client devices 105-125 to the server 145 so the server can update the database and data sets corresponding to the dynamic data map. In some embodiments, the server 145 compiles multiple dynamic data maps from different users into a single, comprehensive data map (e.g., where the sub-maps are modified by different users and a supervisor is permitted access to the combined data maps and data sets).

Figure 4:
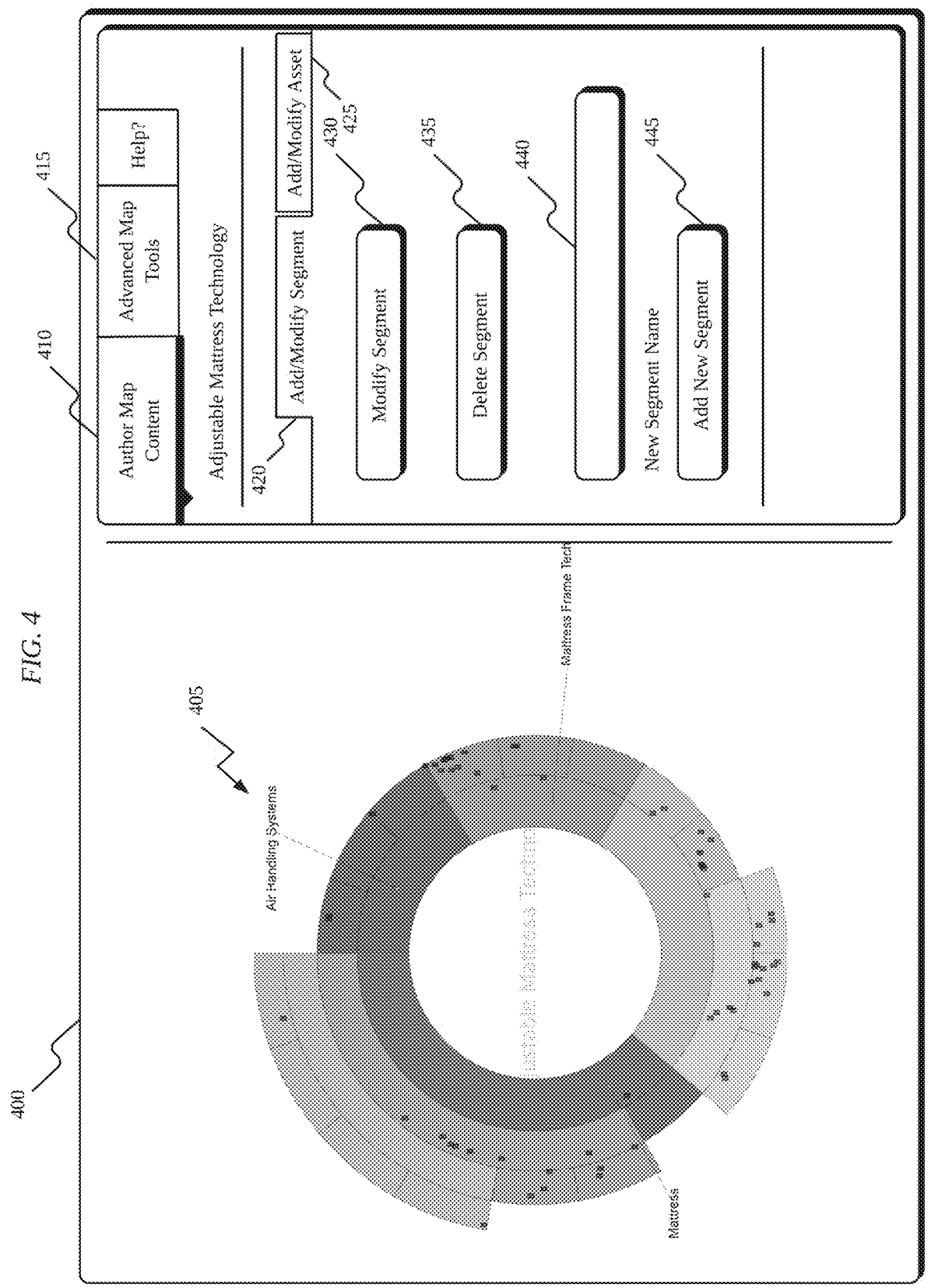
FIG. 4 illustrates a client-side dynamic mapping interface for selectively modifying a data set according to an embodiment of the invention.

FIG. 4 illustrates a client-side dynamic mapping interface 400 for selectively modifying a data set received by the client device (e.g., devices 105-125) from the server 145. The master or parent data set is used by the client device to generate a radial map 405 based on the structure of the data within the parent data set. The interface 400 includes the map 405, an author content tab 410, an advanced map tools tab 415, an add/modify segment tab 420, and an add/modify data asset tab 425. Within the add/modify segment tab 420, a user can choose to modify a segment (e.g., name, etc.) using a modify segment input device, delete a segment using a delete segment input device, or add a new segment using an input text box and an "add new" segment input device. Although the data modification and mapping system 100 can be applied to a variety of different types of data, embodiments of the invention described herein are described primarily with patent related assets due to the rigid and defined structure of patent classification systems (e.g., Cooperative Patent Classification codes, Derwent Classification codes, International Patent Classification codes, United States Patent Classification codes, European Patent Office Classification codes, etc.). However, different types of data are modified and mapped in other embodiments of the invention and the invention is generally applicable to any structured data set including some form of hierarchical information.

Figure 5A:
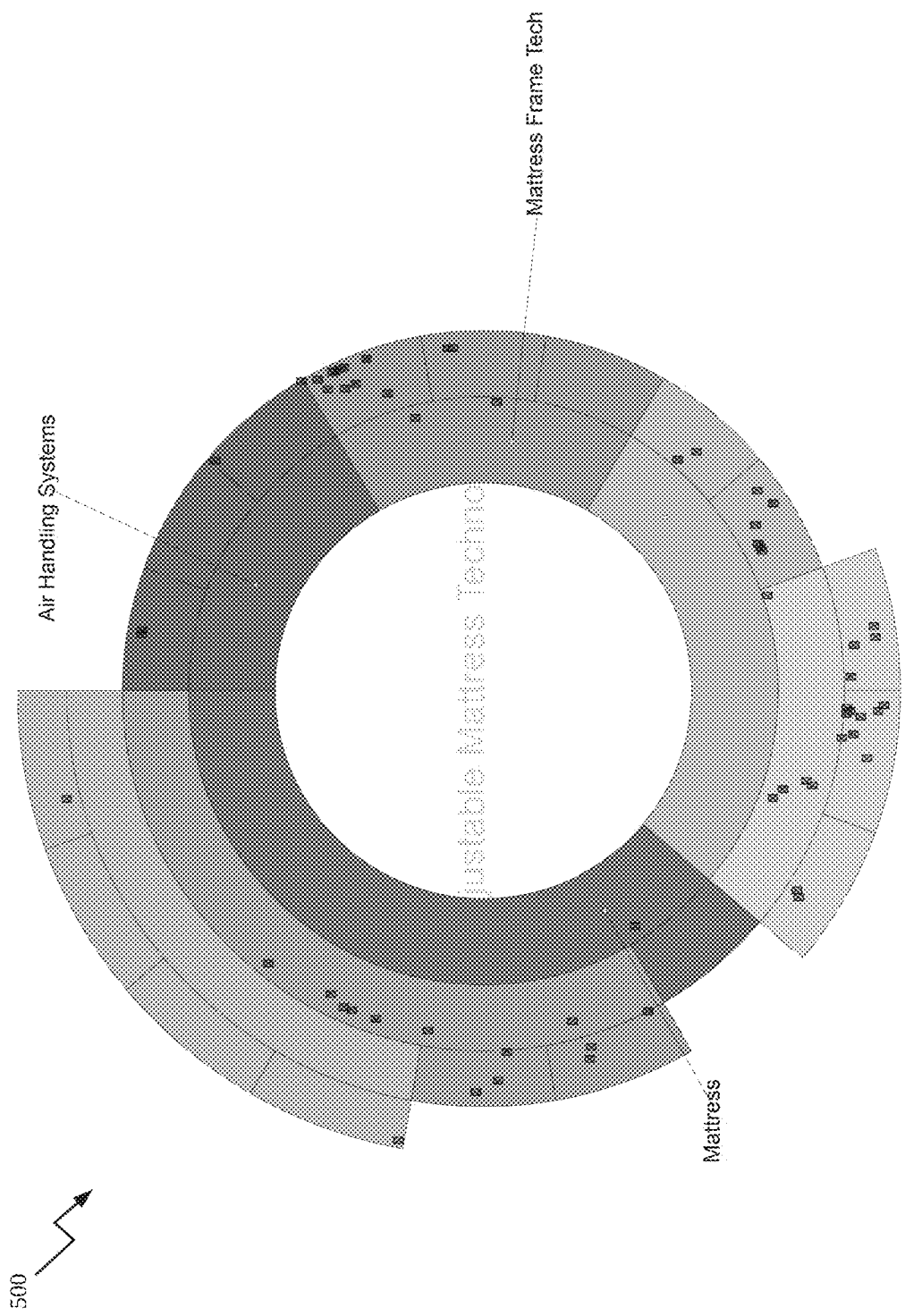
FIG. 5A illustrates a dynamic data map according to an embodiment of the invention.

An exemplary radial map 500 is illustrated in FIG. 5A related to mattress technology. The map 500 includes a series of level-one segments, such as air handling systems, mattress frame technology, mattress, etc. Each level-one segment can include level-two, level-three, level-four, etc., segments related to more specific aspects of the higher level segment, as described in greater detail below. Each segment of the map can include one or more data assets (e.g., patents, published patent applications, etc.) related to the segment in which it appears. Each data asset can be represented with a shape and a color to convey information to a user about, for example, the type of asset or an attribute of the asset (e.g., expired patent, un-expired patent, etc.). The segments within the map 500 are also colored such that different segments within the map are readily identifiable and distinguishable from one another. FIG. 5B illustrates a client-side dynamic mapping interface 505 for adding to or modifying the dynamic data map of FIG. 5A.

Figure 6A:
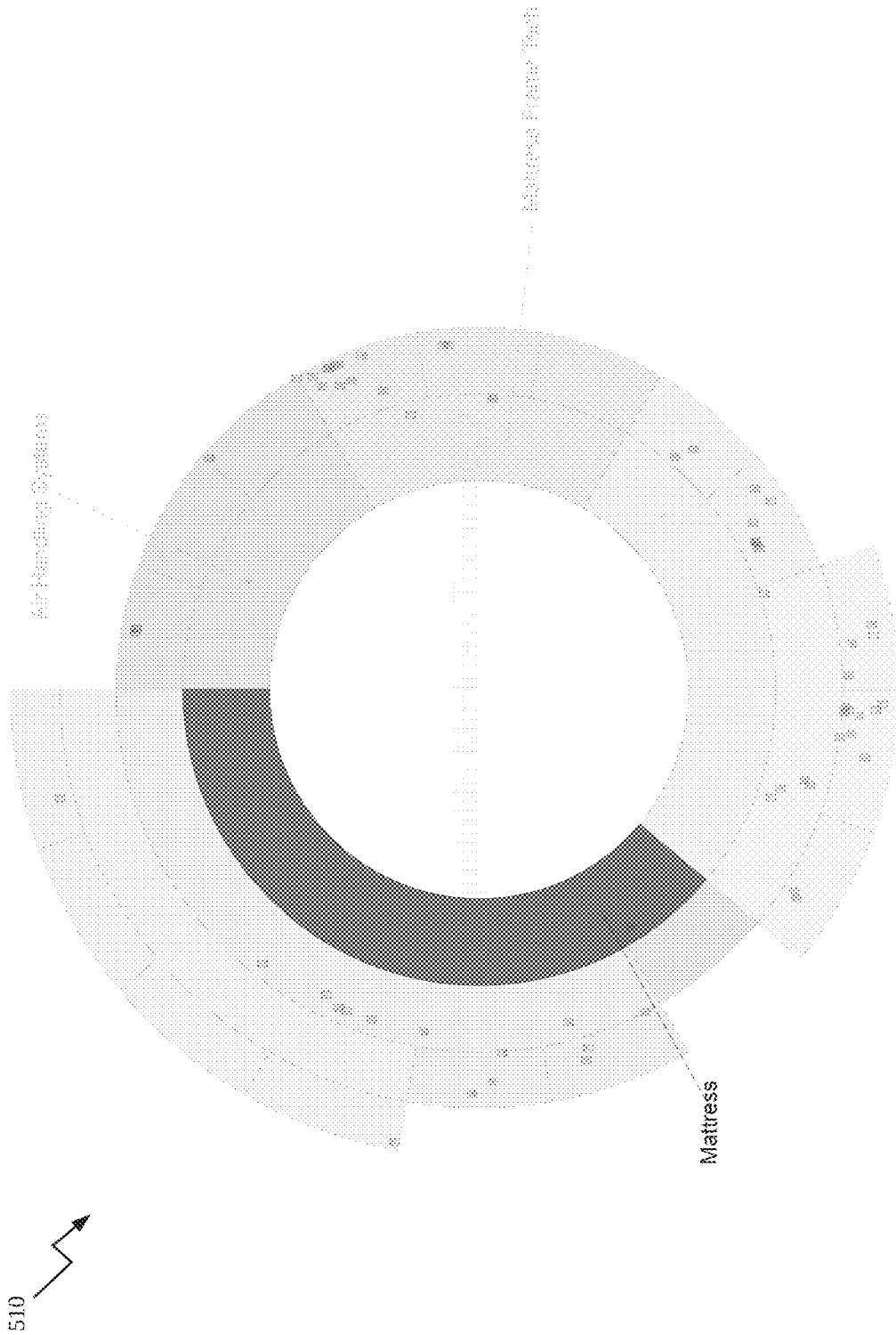
FIG. 6A illustrates a dynamic data map according to an embodiment of the invention with a map segment selected.
Figure 7A:
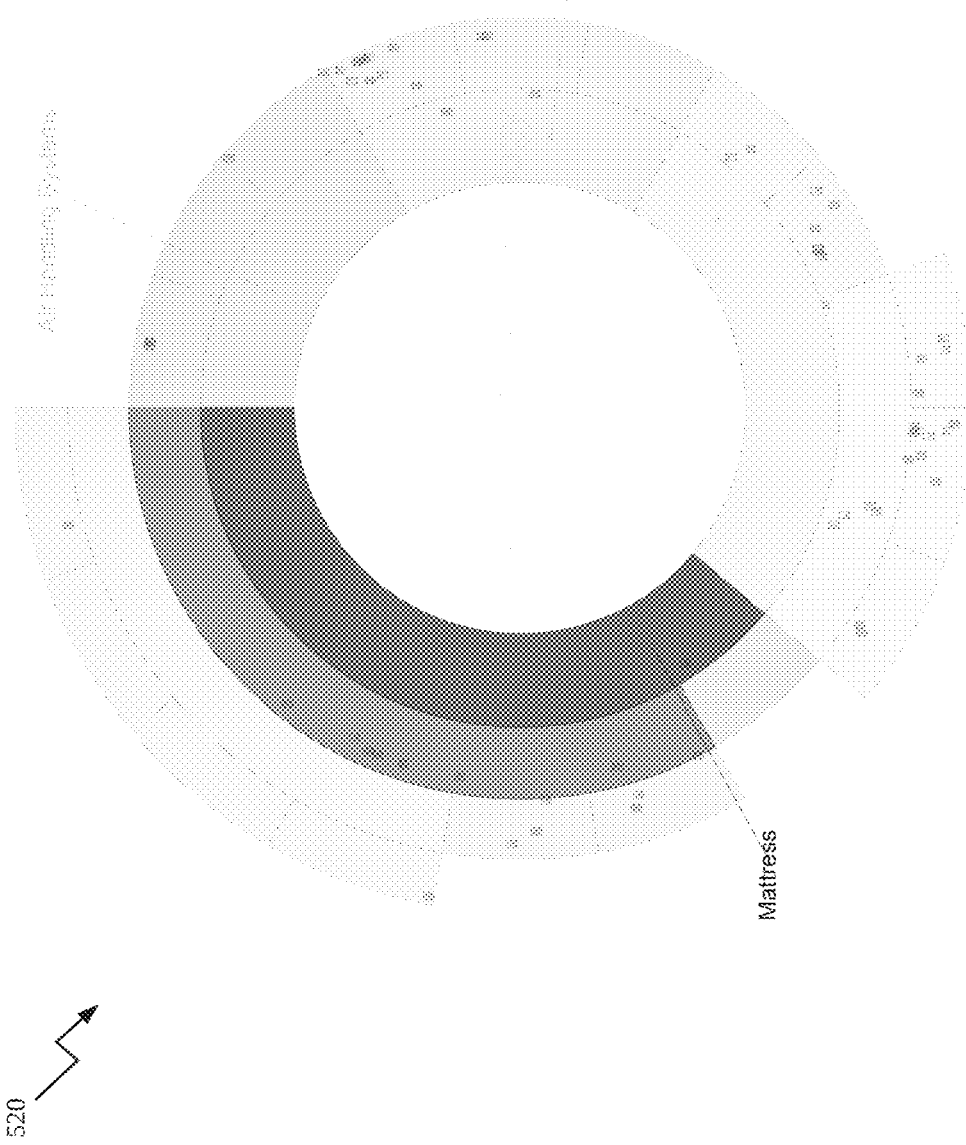
FIG. 7A illustrates a dynamic data map according to an embodiment of the invention with a map segment selected.
Figure 7B:
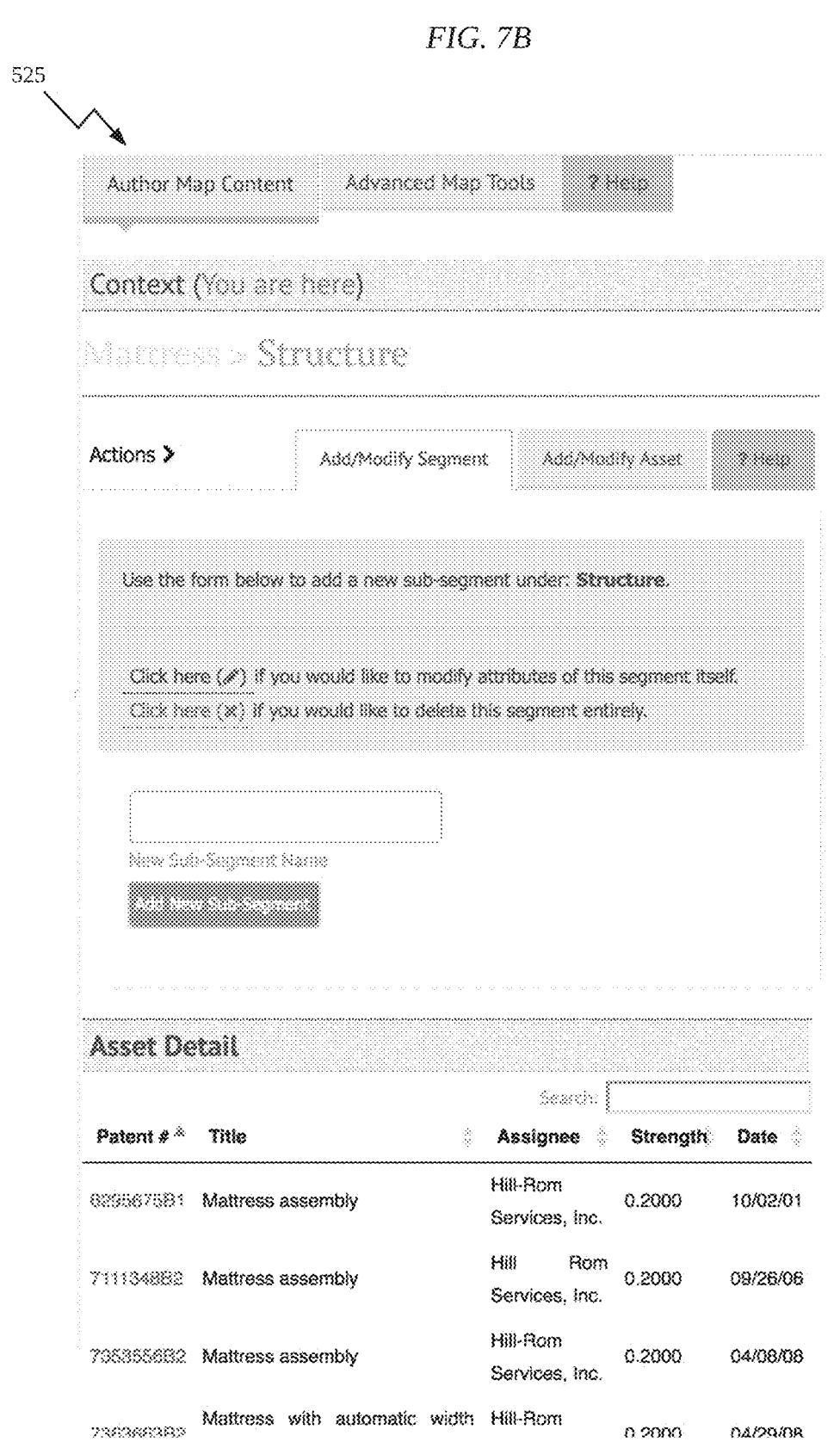

FIG. 6A illustrates a radial map 510 that includes a selected level-one segment. With the segment selected, the map 510 highlights the selected segment by unselecting or greying out the other, unselected segments. FIG. 6B illustrates a client-side dynamic mapping interface 515 for adding to or modifying the dynamic data map of FIG. 6A. The interface 515 also provides information related to data assets that are located within the selected segment. In the illustrated segment and interface, one data asset (e.g., one patent) is illustrated with corresponding information about the asset (e.g., number, title, assignee, strength, issue date, etc.). Similarly, FIGS. 7A and 7B illustrate a radial map 520 and a selected level-two segment and a client-side dynamic mapping interface 525, respectively. When the level-two segment is selected, the parent segment also remains selected (e.g., upstream segments). However, the interface

Figure 8A:
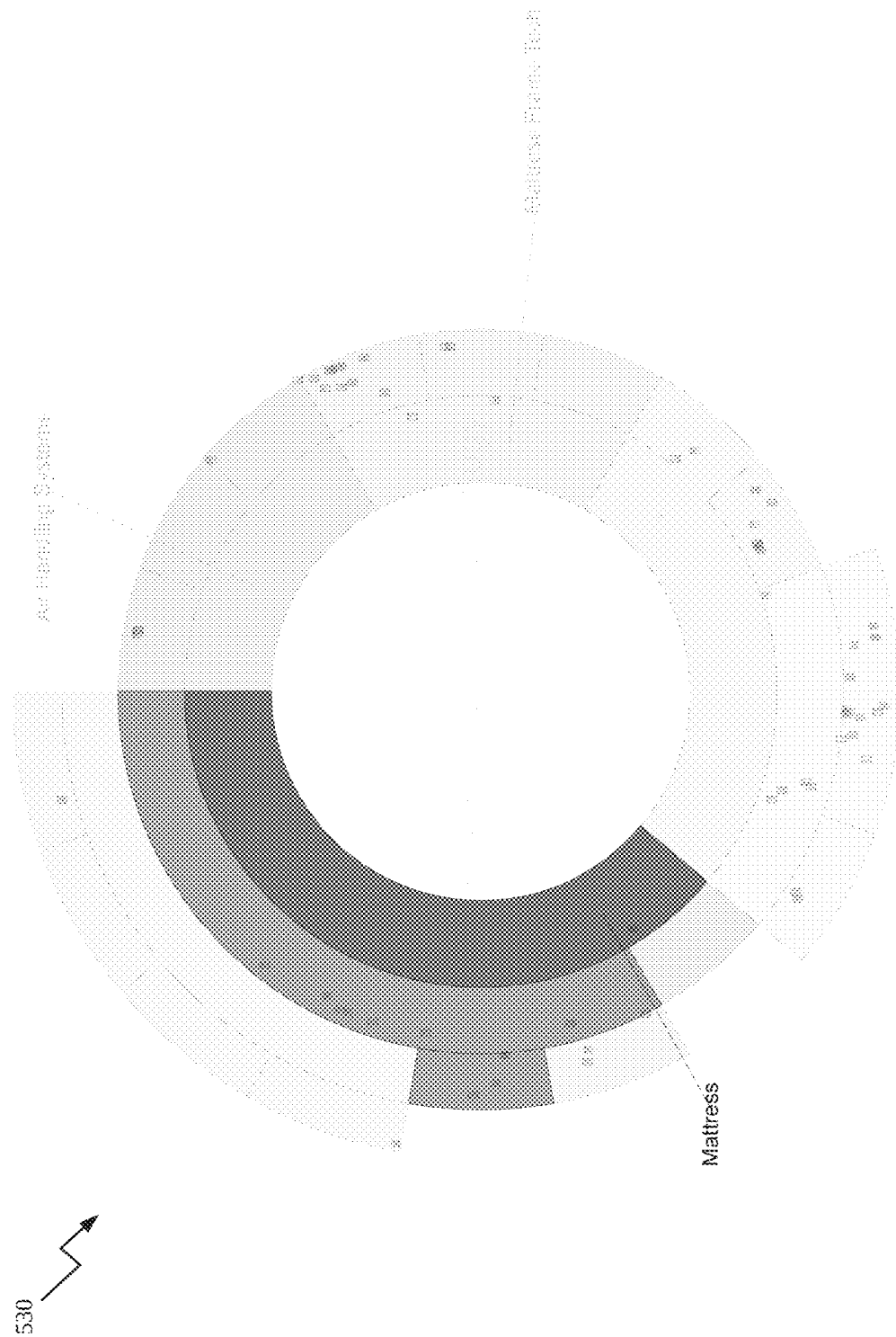
FIG. 8A illustrates a dynamic data map according to an embodiment of the invention with a map segment selected.
Figure 9A:
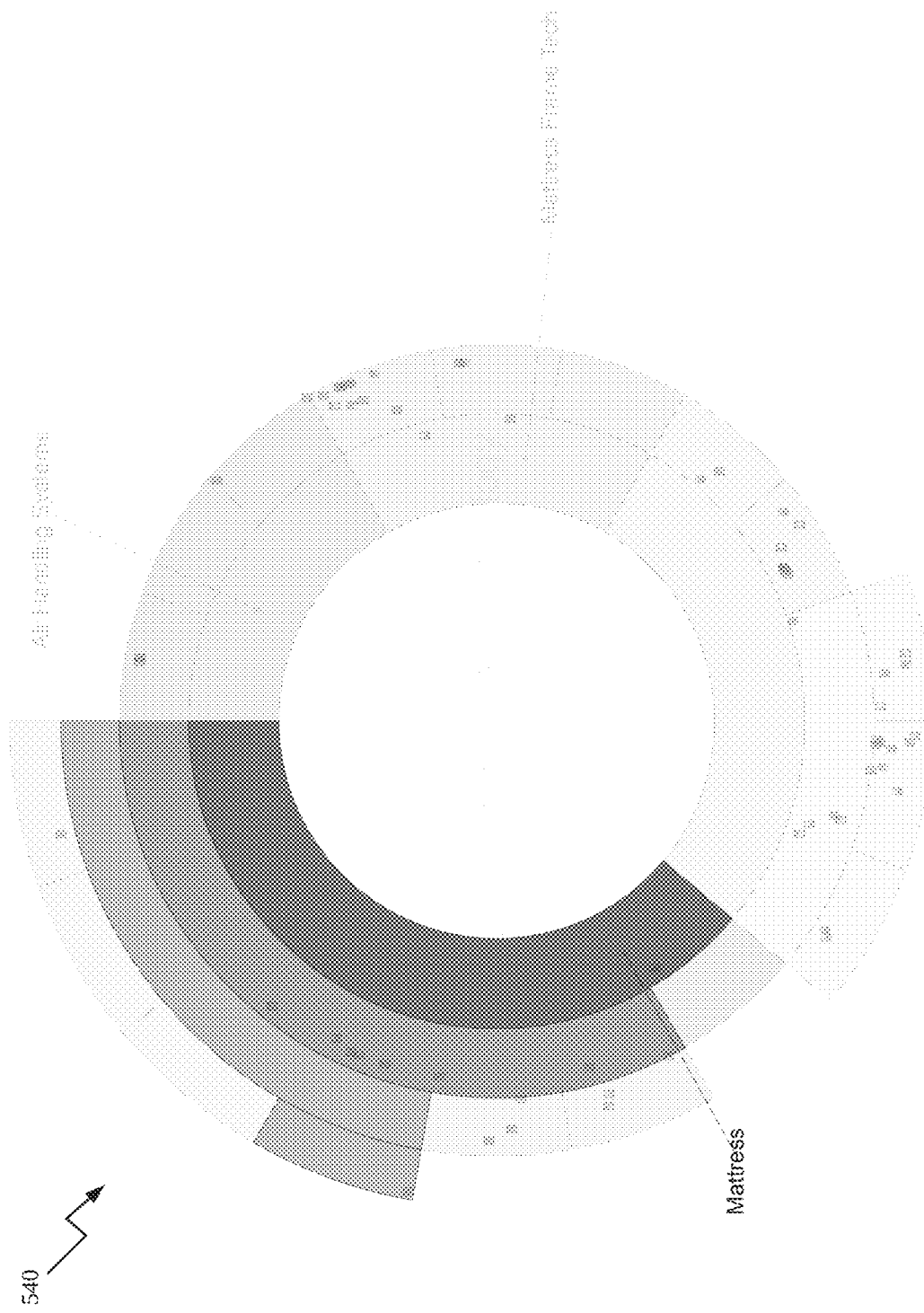
FIG. 9A illustrates a dynamic data map according to an embodiment of the invention with a map segment selected.
Figure 9B:
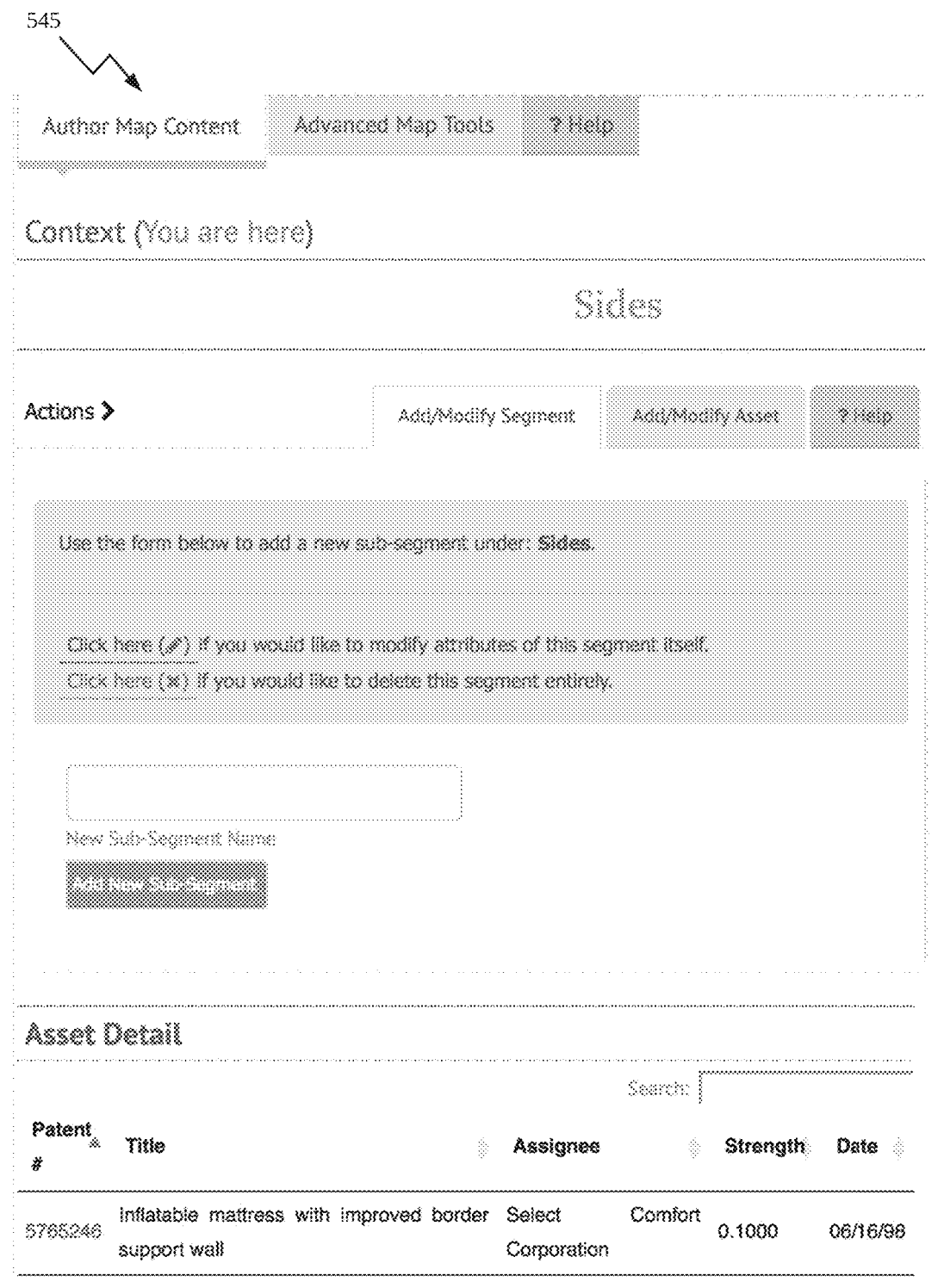

525 only lists the data assets actually located within the selected segment (e.g., not data assets within the parent segment). Similar selection and display of data assets is illustrated for additional levels of the dynamic data map in FIG. 8A (map 530), FIG. 8B (interface 535), FIG. 9A (map 540), and FIG. 9B (interface 545).

When segments are selected, the controller 300 of the client-side device 105-125 limits the data that is being processed to the data assets of the selected segments. For example, if the entire parent or master data set for a dynamic data map were being processed by the client-side device 105-125 as a user navigates through the dynamic data map, the client-side device 105-125 may not have the processing power required to manipulate the map. Client-side devices such as cell phones and tablet computers may have comparatively less processing power than a desktop computer. Rather than assuming that the client-side device has the processing power required to handle an entire dynamic data map, the controller 300 of the client-side device can instead operate on a subset of the parent or master data set to preserve computational resources. In some embodiments, when a segment is selected, data assets from other non-selected segments are pruned from the active memory of the controller 300. As additional or different segments are selected, the data that is loaded in active memory can be changed or updated. For dynamic data maps that include a significant number of segments and data assets, such control over the data that is loaded into active memory improves the controller 300 and the client-side device 105-125's ability to present the dynamic data map and to operate smoothly and responsively. In some embodiments, the controller 300 operates off of the original parent or master data set for the dynamic data map. In other embodiments, the controller 300 creates a copy of the original parent or master data set and operates off of the copy.

The controller 200, 300 of the system 100 is further operable or configured to create additional data sets without user intervention. For example, the controller 200, 300 can create data sets that the controller 200, 300 determines are likely to be a selected subset of the parent or master data set (i.e., corresponding to particular selected segments). In some embodiments, the creation of these data sets is done in the background (e.g., when computational resources are available). The created data sets can be saved by the client side device 105-125 or the server 145 for future retrieval. By generating these data sets, a library of potential data sets for a given dynamic data map can be created which allows faster operation of the map because subsets of data assets do not need to be generated in real-time in response to user input. Because generating subsets of data assets is computationally expensive and the client-side device has relatively limited resources (e.g., compared to the server 145), the server 145 can test the client-device 105-125 to benchmark the device's processing capabilities. By doing so, the server can select one or more subsets of the parent or master data set (e.g., from a library of generated data subsets) and pre-load the most common or likely data subsets onto the client device 105-125.

Figure 10:
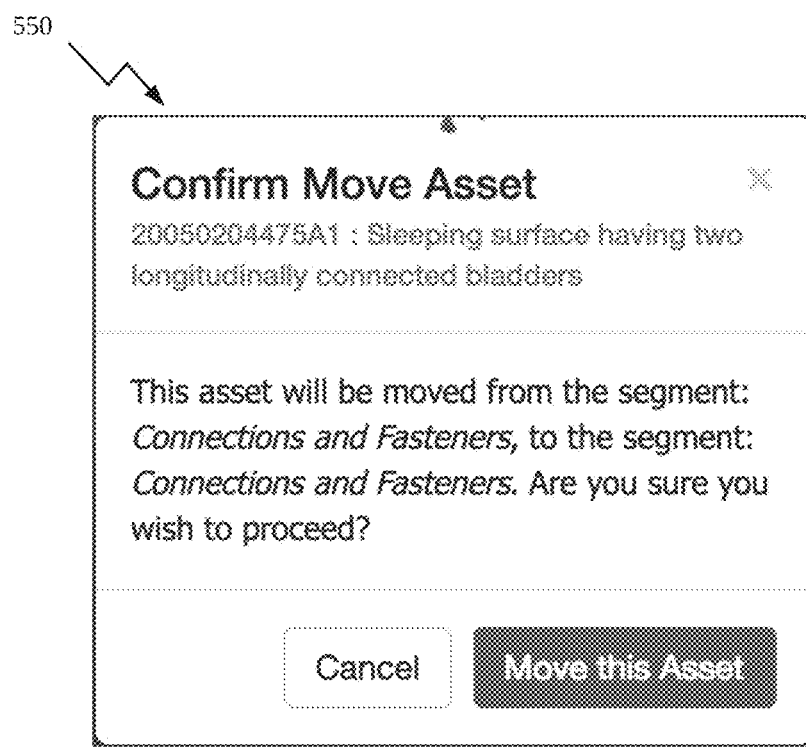
FIG. 10 illustrates a client-side interface related to the translation of a data asset from one segment of a dynamic data map to another, different segment of the dynamic data map.

In addition to selecting segments within a dynamic data map, a user can also select specific data assets to be moved within the dynamic data map or modified (e.g., modifying bibliographic information, modifying strength, modifying importance, etc.). FIG. 10 illustrates an interface 550 related to moving a data asset from one segment to another. Moving a data asset from one location in a dynamic data map to another location in the data map, for example, de-couples the data asset from the hierarchical structure used to generate the map. In some embodiments, upon moving the data asset (e.g., dragging the asset to a different map location using a mouse or touch-screen interface), the data asset is re-associated with the new segment and couples the data asset to the hierarchical structure available for the new segment (e.g., the data asset is automatically reclassified based on the user's input to move the data asset).

Figure 11A:
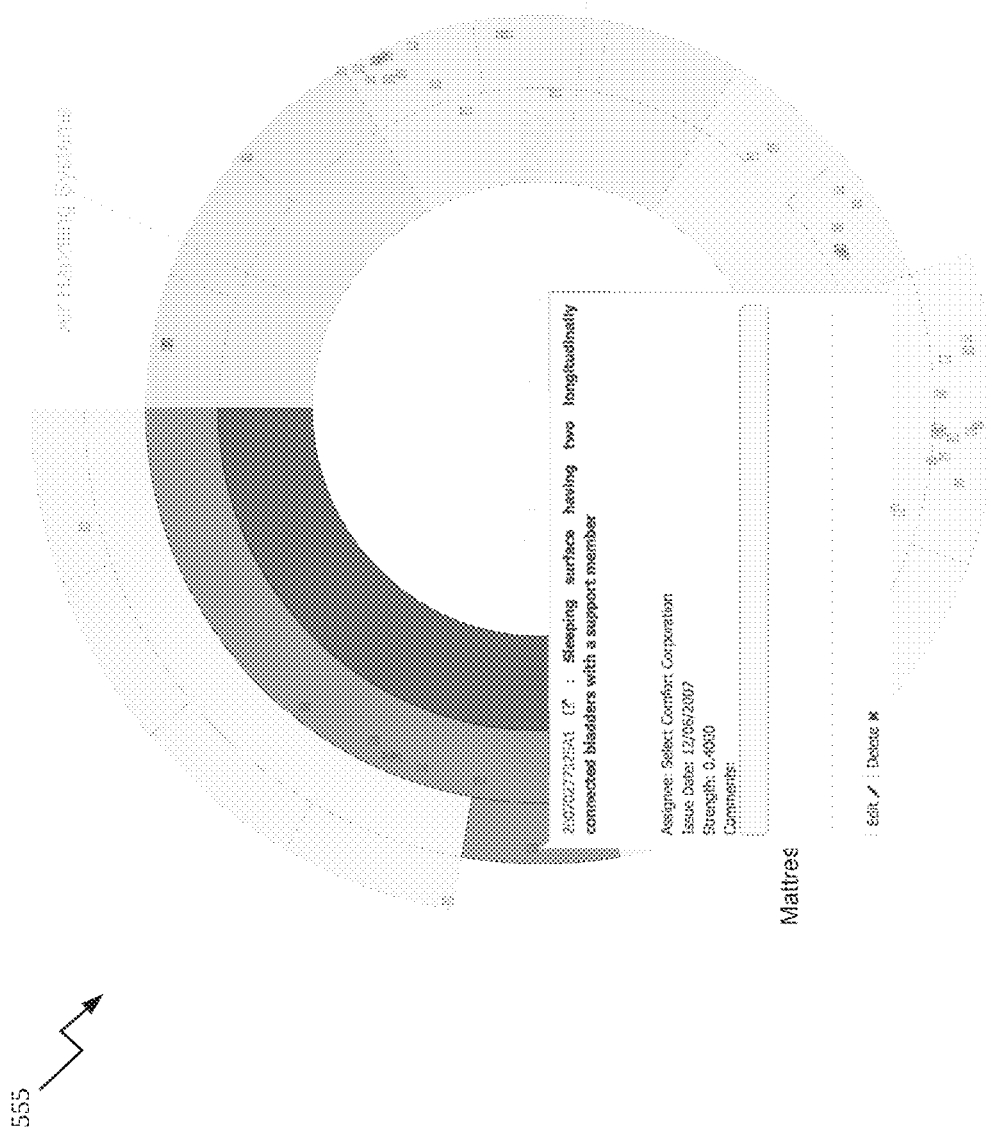
FIG. 11A illustrates data within a client-side dynamic data map and associated with a selected data asset.
Figure 11B:
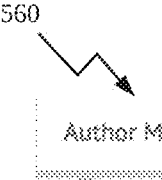
FIG. 11B illustrates a client-side dynamic mapping interface for modifying information associated with the selected data asset within the dynamic data map of FIG. 11A.

When navigating a dynamic data map, such as the dynamic data map 555 in FIG. 11A, selecting a data asset opens a window that provides additional information about the asset (e.g., patent publication number, issue date, strength, comments, etc.). A user is also able to edit the data asset by selecting an edit button using an interface such as interface 560 in FIG. 11B. The interface 560 provides general information about the data asset and allows the user to modify a strength, symbol, or color associated with the data asset.

Figure 12A:
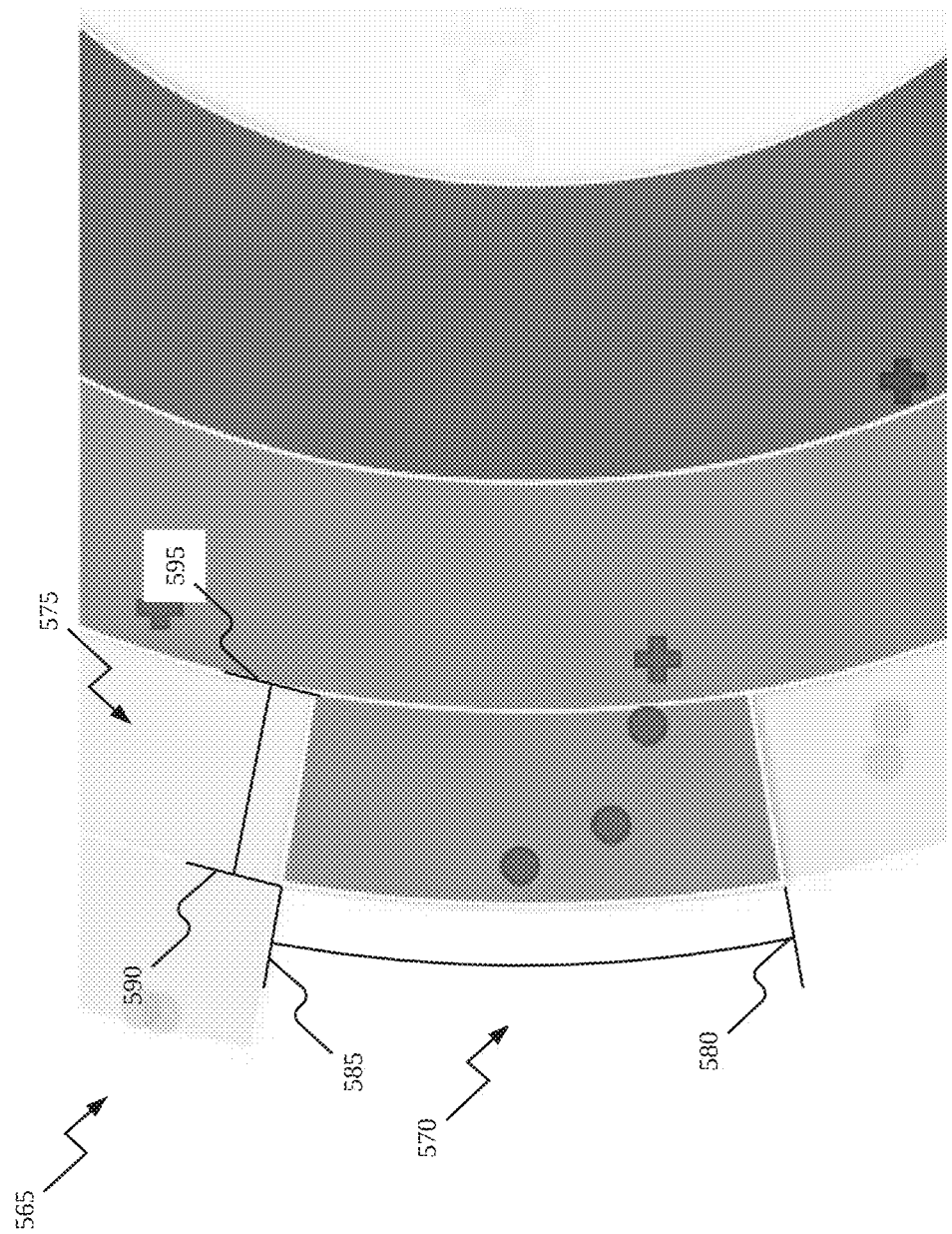
FIG. 12A illustrates a segment of a client-side dynamic data map and four dimensions of mapping information.
Figure 12B:
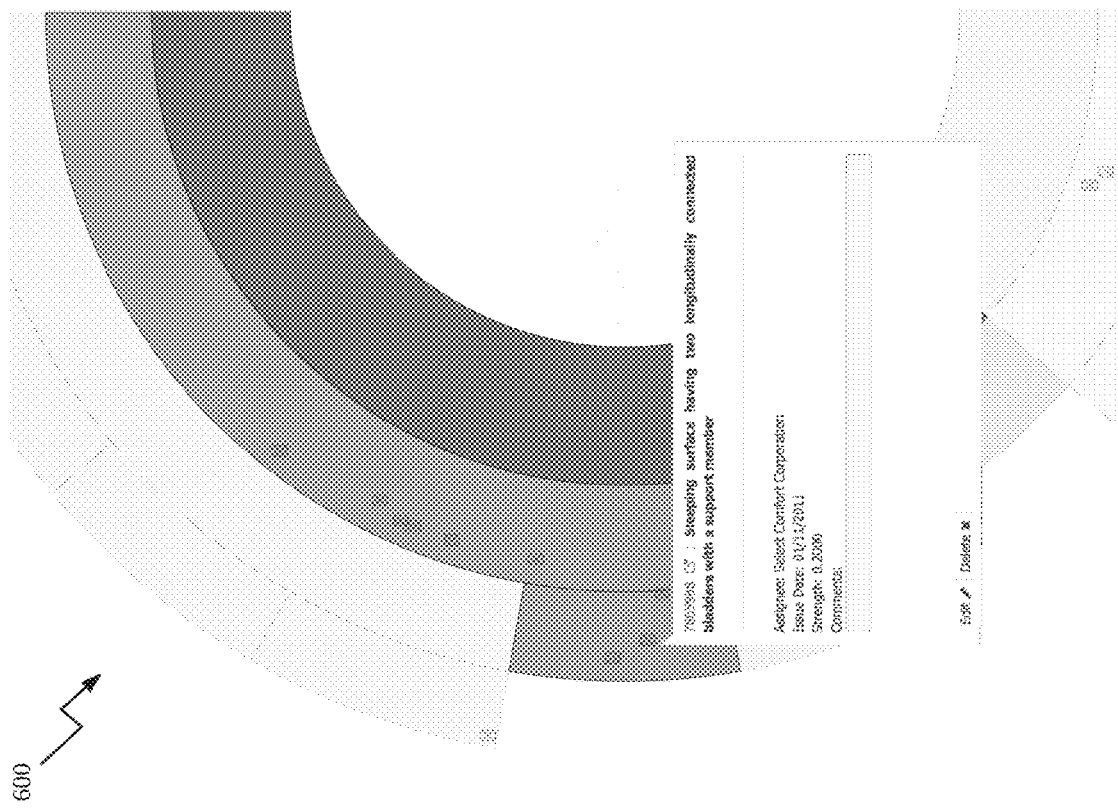
FIG. 12B illustrates the segment of the client-side dynamic data map of FIG. 12A and a data asset of relatively low importance and relatively chronologically recent.
Figure 12C:
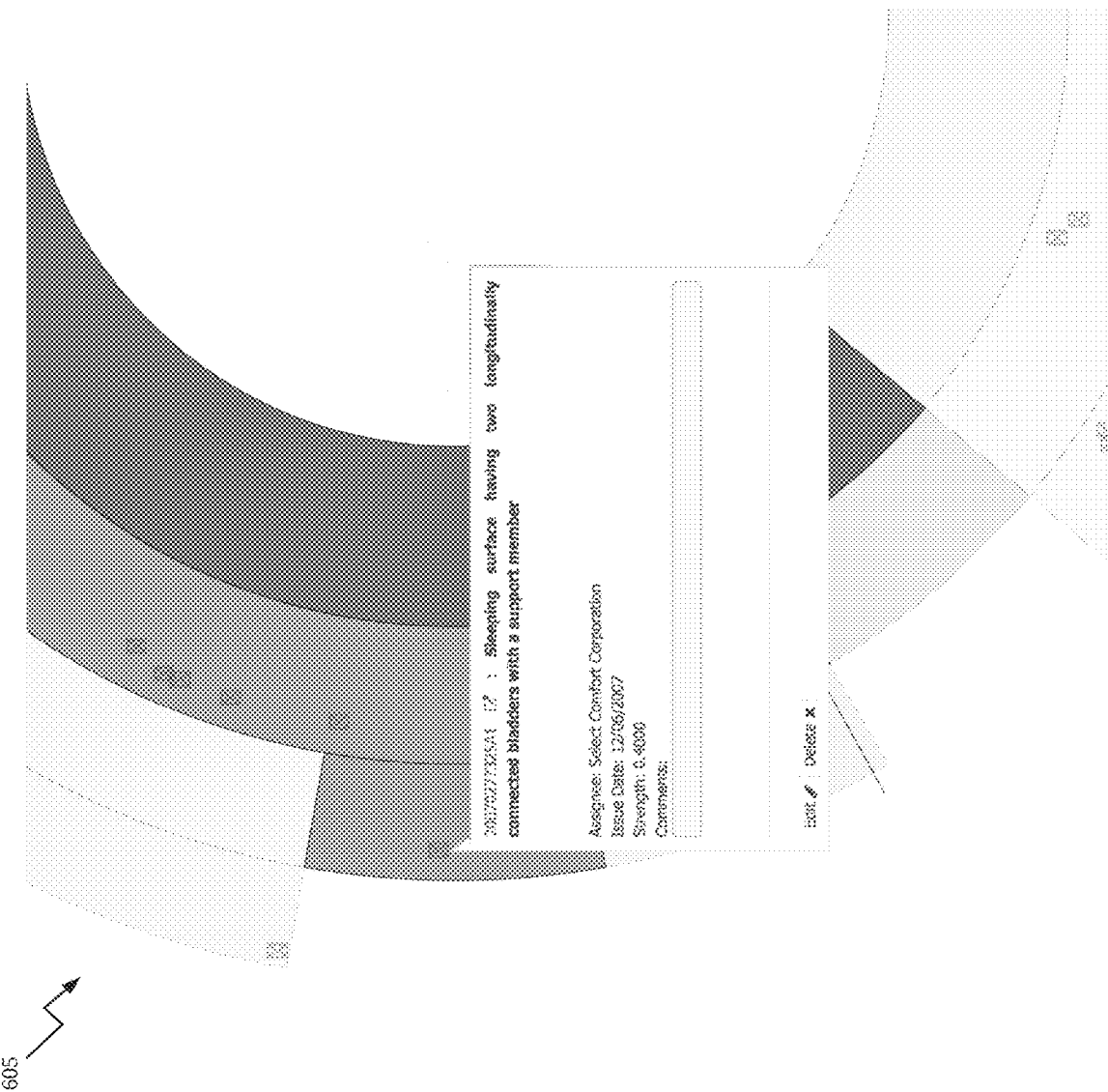
FIG. 12C illustrates the segment of the client-side dynamic data map of FIG. 12A and a data asset of medium importance and chronologically before the data asset of FIG. 12B.
Figure 12D:
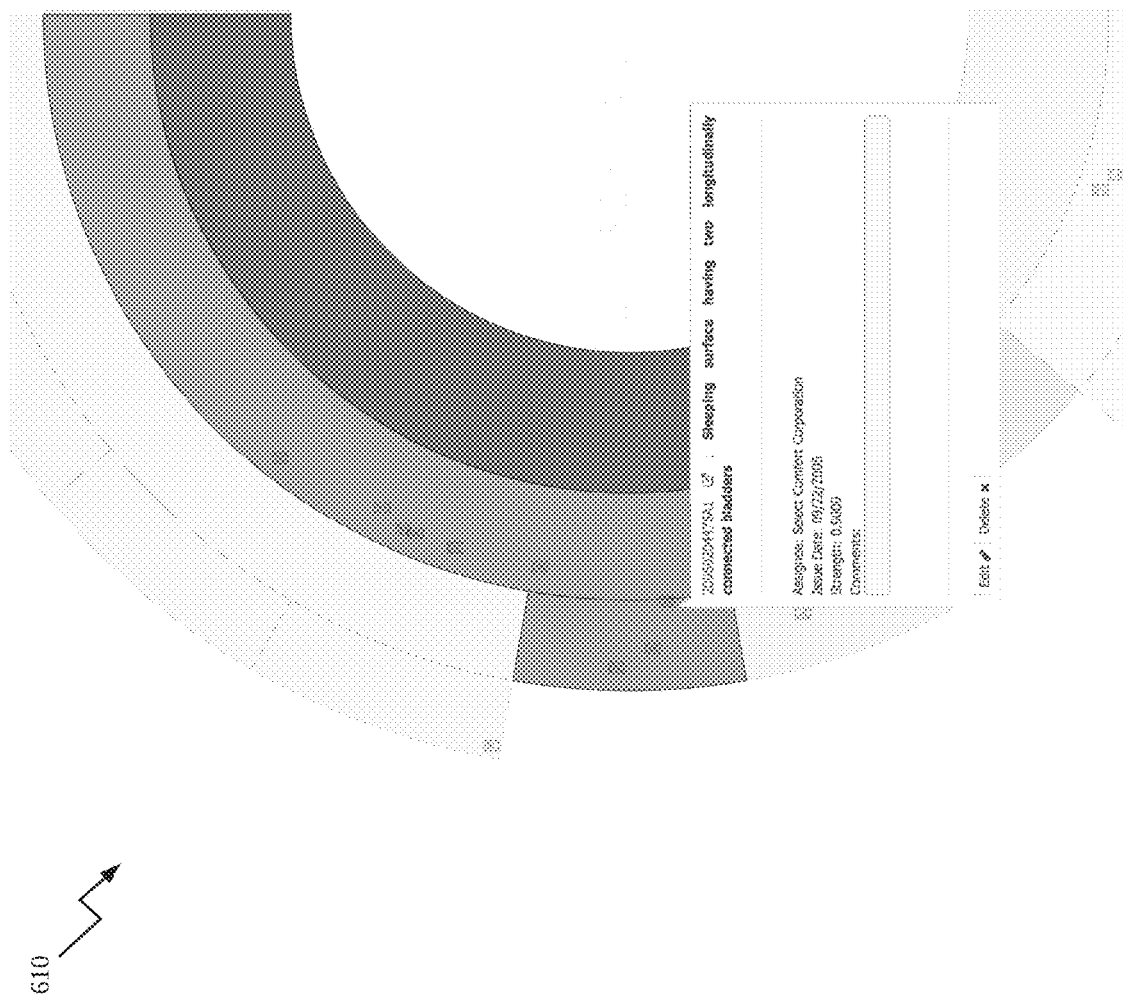
FIG. 12D illustrates the segment of the client-side dynamic data map of FIG. 12A and a data asset of high importance and chronologically before the data asset of FIG. 12C.
Figure 12E:
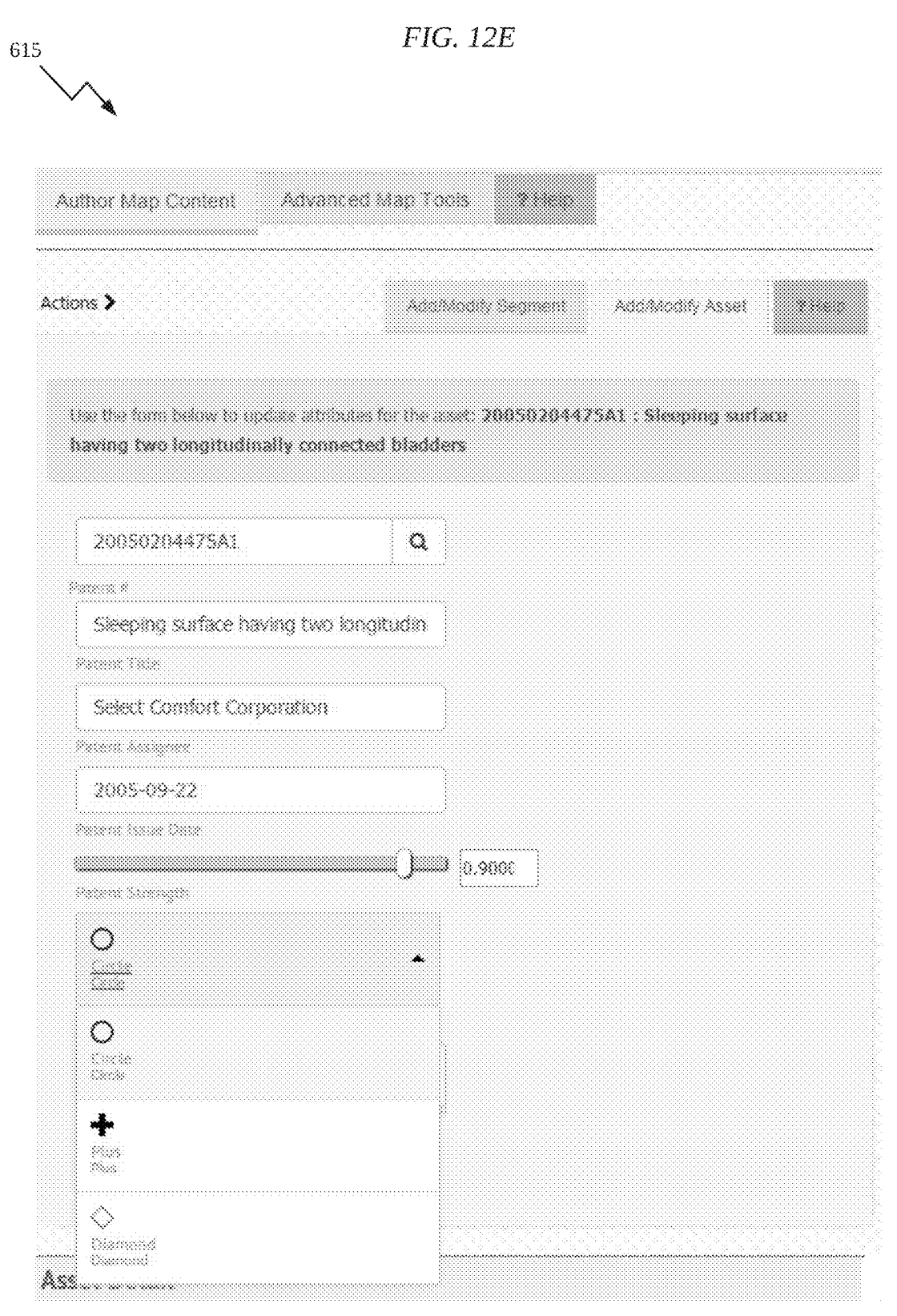

Each data asset within a given map segment includes four or more dimensions of information. For example, FIG. 12A illustrates a map segment 565 that includes three data assets. Within the radial map, each segment conveys information about the data assets in the segment based on the relative position of the data assets within the map. For example, the location of the segment within the larger radial map demonstrates how broad or specific a given segment is within the hierarchical map structure. A segment lower in the map (e.g., a level-three segment) is generally narrower than a segment higher in the map (e.g., a level-one segment). Additionally, the shape and color of a particular data asset can convey information about the type and/or an attribute of the data asset (e.g., expired patent, un-expired patent, a patent that has been enforced, etc.). The segment 565 of FIG. 12A also illustrates two relational dimensions of information that are dependent upon the positioning of an asset within the segment. First, in the radial direction of the map, a fourth dimension or parameter 575 (e.g., time, patent strength, patent importance, etc.) is illustrated. Extending radially to a first end 590 of the fourth dimension 575 to a second end 595 of the fourth dimension 575 conveys information about the fourth dimension 575. For example, the closer a data asset is to the first end 590 of the fourth dimension 575, the lower the strength or importance of the data asset (e.g., an importance of 0.1). However, the closer the data asset is to the second end 595 of the fourth dimension 575, the greater the strength or importance of the data asset (e.g., an importance of 0.9). Second, the location of the data assets circumferentially or along the arc of the segment illustrates a fifth dimension or parameter 570 (e.g., age of the data asset). Extending circumferentially along the segment's arc from a first end 580 of the fifth dimension 570 to a second end 585 of the fifth dimension 570 conveys information about the fifth dimension. For example, the closer a data asset is to the first end 580 of the fifth dimension 570, the older the data asset (e.g., patent that issued 20 years ago). However, the closer the data asset is to the second end 585 of the fifth dimension 570, the newer the data asset (e.g., a patent that issued one year ago). The parameters corresponding to any of the disclosed dimensions of the dynamic data map can be selected or customized by the user in order to generate a data map that conveys desirable information. FIGS. 12B, 12C, and 12D illustrate the relative locations of the three data assets in the segment 565 (FIG. 12A). As illustrated, the strength and age of the data assets varies with the location of the data asset within the segment 565. A user is also able to edit the data assets within the segment 565 by selecting an edit button and using an interface such as interface 615 in FIG. 12E. Any of the three data assets within the segment 565 can be modified by the user (e.g., modify a strength or symbol associated with the data asset).

The parent or master data set received at the client device 105-125 can be updated or modified by a user by adding segments and/or data assets to the dynamic data map. Segments and/or assets can be added to the parent or master data set received by the client device 105-125 in a variety of ways. For example, segments and/or assets can be individually, manually added by a user through the user interface of the client device 105-125. In other embodiments, segments and/or assets can be imported, searched and added, uploaded, predicted, etc. Various techniques for adding segments and/or assets to the parent or master data set for subsequent visual representation in dynamic data map are described below.

Figure 13A:
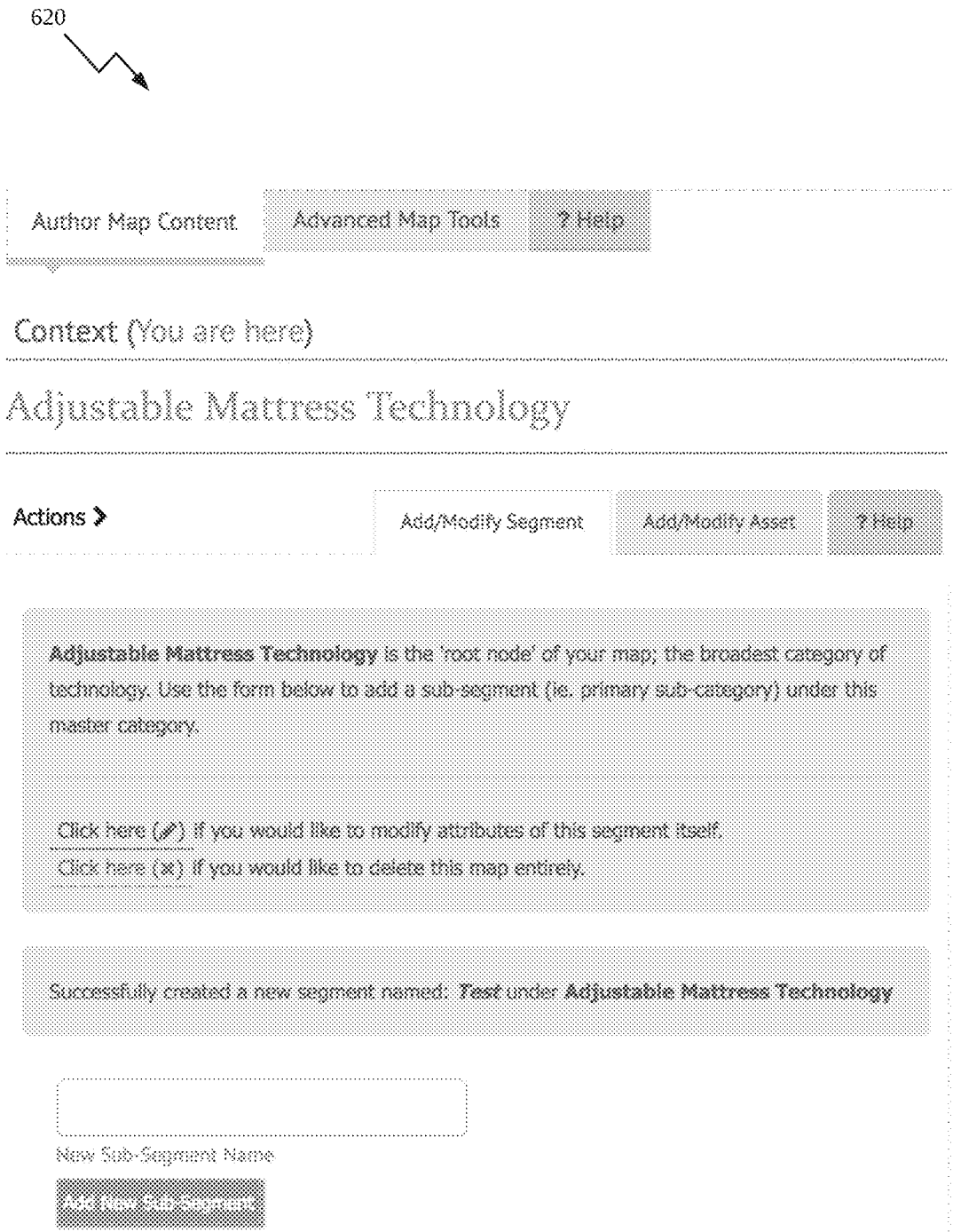
FIG. 13A illustrates a client-side dynamic mapping interface for adding user data to a given data set associated with a dynamic data map.
Figure 13B:
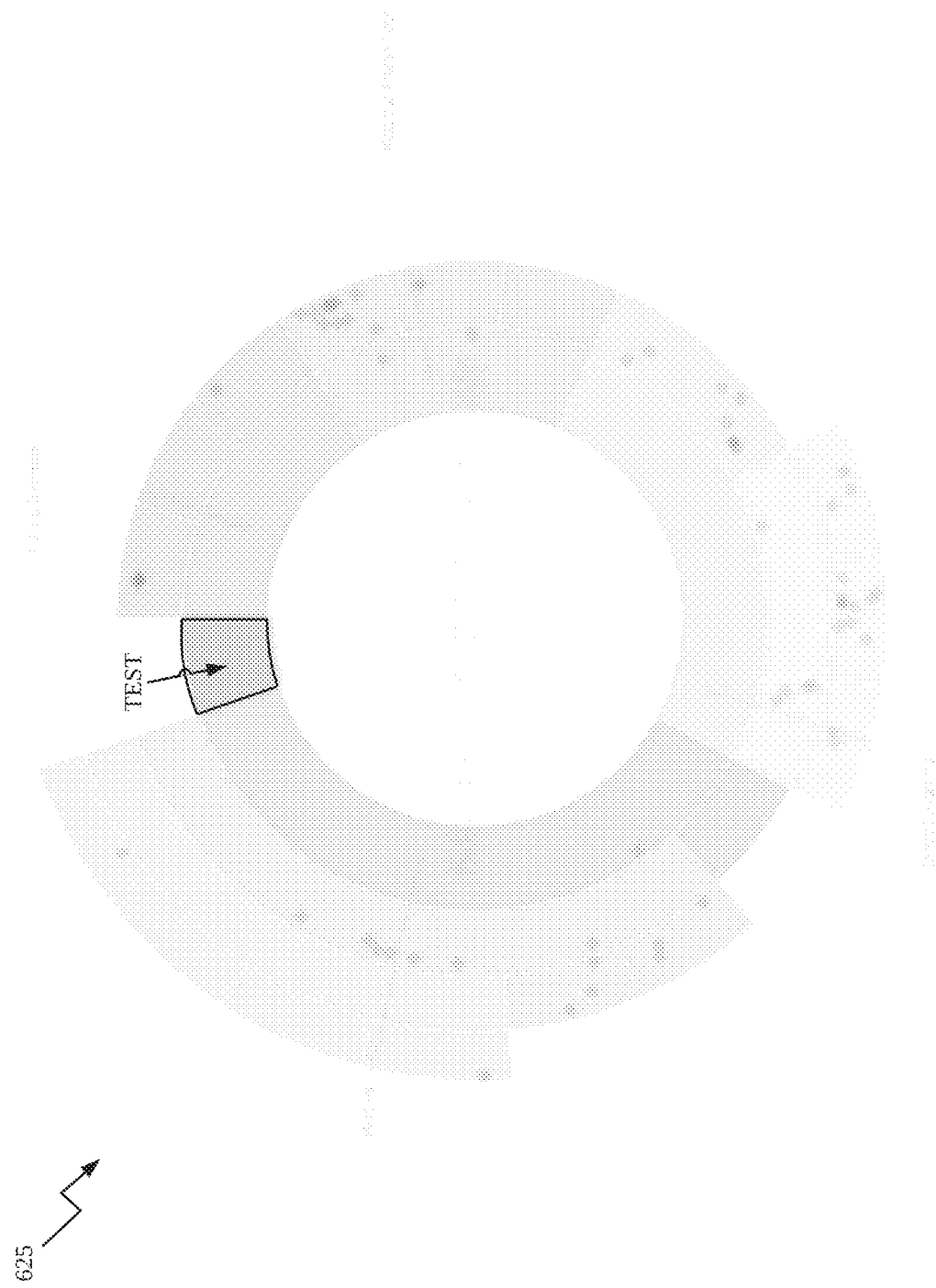
FIG. 13B illustrates a dynamic data map with user data dynamically added to the data set using interface of FIG. 13A.

FIG. 13A illustrates a dynamic data map interface 620 for individually, manually adding a segment to a data map 625 (see FIG. 13B). The added segment TEST is illustrated as a new level-one segment in FIG. 13B. The new segment is automatically placed within the data map and will be automatically expanded or contracted based on, for example, the number of sub-levels to the segment, the number of assets in the segment, etc.

Figure 15:
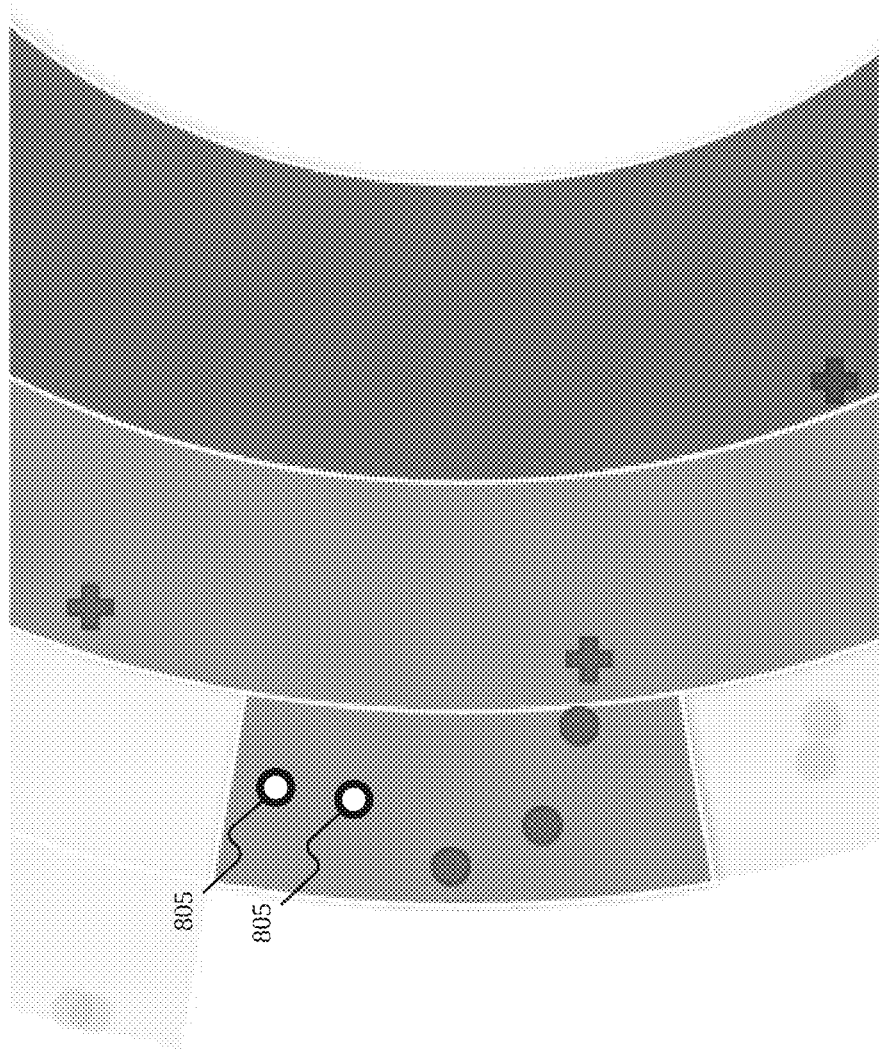
FIG. 15 illustrates another predictive map including a predicted future asset.

In addition to being able to individually, manually add segments and/or assets, assets can be predictively added to a dynamic data map using, for example, one or more extrapolation or regression techniques. FIG. 14 illustrates such a predictive map 700 of one or more future assets. The map 700 is illustrated as a graph including an x-axis 705 and a y-axis 710. In the illustrated embodiment, the x-axis 705 represents time and the y-axis 710 represents asset strength. In other embodiments, the y-axis represents a different characteristic, such as importance or quantity (e.g., number of assets in a given time period or interval). The map 700 includes a number of existing assets 715. The assets can correspond to, for example, a map or map segment such as the map segment 565 illustrated in FIG. 12A. The map 700 also includes a predicted asset 720. The asset 720 does not correspond to a currently existing asset. Rather, the asset 720 is an asset generated by the system 100 based on the existing assets 715. Based on the assets 715, the system 100 predicts when one or more additional assets are likely to appear (e.g., when a new patent application will publish). A similar illustration of a predicted asset can be represented as a map or map segment, such as the map segment 800 and predicted asset 805 illustrated in FIG. 15.

The system 100 generates predicted assets based on the number of assets in a particular map segment and the frequency with which the assets appear. For example, the assets in a particular map segment can be evenly disbursed within the segment or bunched in a particular portion of the segment. The position of a predicted asset varies depending on the distribution of the assets within the segment. For example, a cluster of assets for a temporally early portion of a segment followed by very few assets later in the segment suggest that a new asset is not likely to appear in the segment. Conversely, very few assets early in a segment followed by a cluster of assets later in the segment suggest that a new asset is likely to appear later in the segment (i.e., in the future).

The system 100 utilizes a variety of predictive techniques to determine or extrapolate when a new asset is likely to appear and can also, for example, extrapolate the potential strength of that asset. As such, the system 100 can predict not only when a new asset may appear, but also other characteristics of that asset, such as strength or importance. Each prediction is based on the currently existing assets in a particular segment. Additionally, the system 100 is capable of predicting one or a plurality of additional assets. In some embodiments, the number of assets that the system 100 predicts is based on the likelihood of a new asset appearing (e.g., if an asset is very likely to appear, the system predicts several new assets). Based on the existing assets in a segment, the system 100 uses linear regression, polynomial regression, or non-linear regression techniques to predict new assets. Non-linear regression techniques include the use of power functions, logarithmic functions, trigonometric functions, exponential functions, Gaussian functions, Lorenz curves, etc. A regression trendline or curve can be generated and/or displayed on a map (e.g., map 700 or map segment 800). One skilled in the art in light of the invention described herein would understand how to apply the noted regression techniques to the assets in a particular map or segment representing, for example, patent assets and the assets' timing, strength, importance, etc. In some embodiments, the system 100 inputs the dates on which assets have published (e.g., published patent applications, patent grant dates, etc.) across a desired date range (e.g., one year, 20 years, and the like) into any suitable regression formula to generate one or more dates upon which one or more corresponding additional patent applications or patents are predicted to publish. Such predicted patent applications or patents can then be illustrated in a map or map segment as predicted assets, and can have shapes and/or colors selected to differentiate them from other assets on the map or map segment.

In the context of the assets as patents, the timing of an asset corresponds to patent application filing date, publication date, issue date, etc. Predicted patent assets can similarly correspond to a predicted filing date, publication date, issue date, etc. As described above, a map can include assets corresponding to a particular classification, assignee, technology, etc. As such, a plurality of different predictions can be made or combined. For example, future assets can be predicted for two (or more) assignees in a particular technology area. The results of the prediction (e.g., two trendlines, predicted assets, etc.) can show convergence in the technology area. Such convergence provides an indication of where the technology area or field is headed in the future.

FIGS. 16A-16F are a process 900 for adding new segments and/or assets to a new or existing dynamic data map, as well as modifying attributes of segments and/or assets in a dynamic data map. The process 900 is capable of being executed by the controller 200 of the server 145 or the controller 300 of the client-side devices 105-125. In some embodiments, the execution of the process 900 is divided between the controller 200 and the controller 300 such that some steps of performed by the server 145 (e.g., updating a parent or master data set) and other steps are performed by the client-side devices 105-125 (e.g., updating a parent or master data set, selecting a segment and/or asset to modify, etc.). The computer readable instructions required to execute the process 900 are stored in the respective non-transitory computer readable data storage mediums (e.g., memory 220, memory 330, etc.) associated with the server 145 and the client-side devices 105-125. The process 900 is illustrated in FIGS. 16A-16F in an illustrative manner, and the process 900 can include additional, different, or fewer steps. In some embodiments, the steps of the process 900 can be executed in an order other than the specific order in which the steps of the process 900 are illustrated in FIGS. 16A-16F.

The process 900 begins with at step 905 with the controller 200, 300 determining whether a new map is to be created. In some embodiments, a new map corresponds to a map where there are no parent or master data sets and a new dynamic data map is being created from nothing. In other embodiments, creating a new map is effected from an existing set of parent or master data and a selected portion of the parent or master set of data is used to create the new map. If no new map is going to be created at step 905, the process 900 proceeds to step 910 where the controller 200, 300 determines whether an existing map is to be modified. If no existing dynamic data map is to be modified at step 910, the process 900 returns to step 905 and waits for either a new map to be created or a modification of an existing map to be made. If, at step 910, an existing map requires modification, the process 900 proceeds to step 915 where the controller 200, 300 determines whether an existing segment in the dynamic data map requires modification. If an existing step requires modification, the process 900 proceeds to control section B of the process 900 and FIG. 16B. If no existing segment requires modification, the process 900 proceeds to step 920 where the controller 200, 300 determines whether a new segment is to be added to the dynamic data map. If a new segment needs to be added to the dynamic data map, the process 900 proceeds to control section C of the process 900 and FIG. 16C. If no new segments need to be added to the dynamic data map, the process 900 proceeds to step 925 where the controller 200, 300 determines whether an existing segment is to be deleted from the dynamic data map. If an existing segment is to be deleted from the dynamic data map, the process 900 proceeds to control section D of the process 900 and FIG. 16D. If no existing segment requires deletion or removal from the dynamic data map, the process 900 proceeds to control section G and step 930 of the process 900. At step 930, the controller 200, 300 determines an asset is to be added or modified, the process 900 proceeds to control section E and FIG. 16E. If no assets are to be added or modified, the controller 200, 300 determines whether an existing asset within a dynamic data map is to be moved (step 935). If, at step 935, the controller 200, 300 determines that an asset in the dynamic data map is to be moved, the process 900 proceeds to control section F and FIG. 16F. If no asset in the dynamic data map is to be moved, the process 900 returns to control section A and step 905.

Figure 16A:
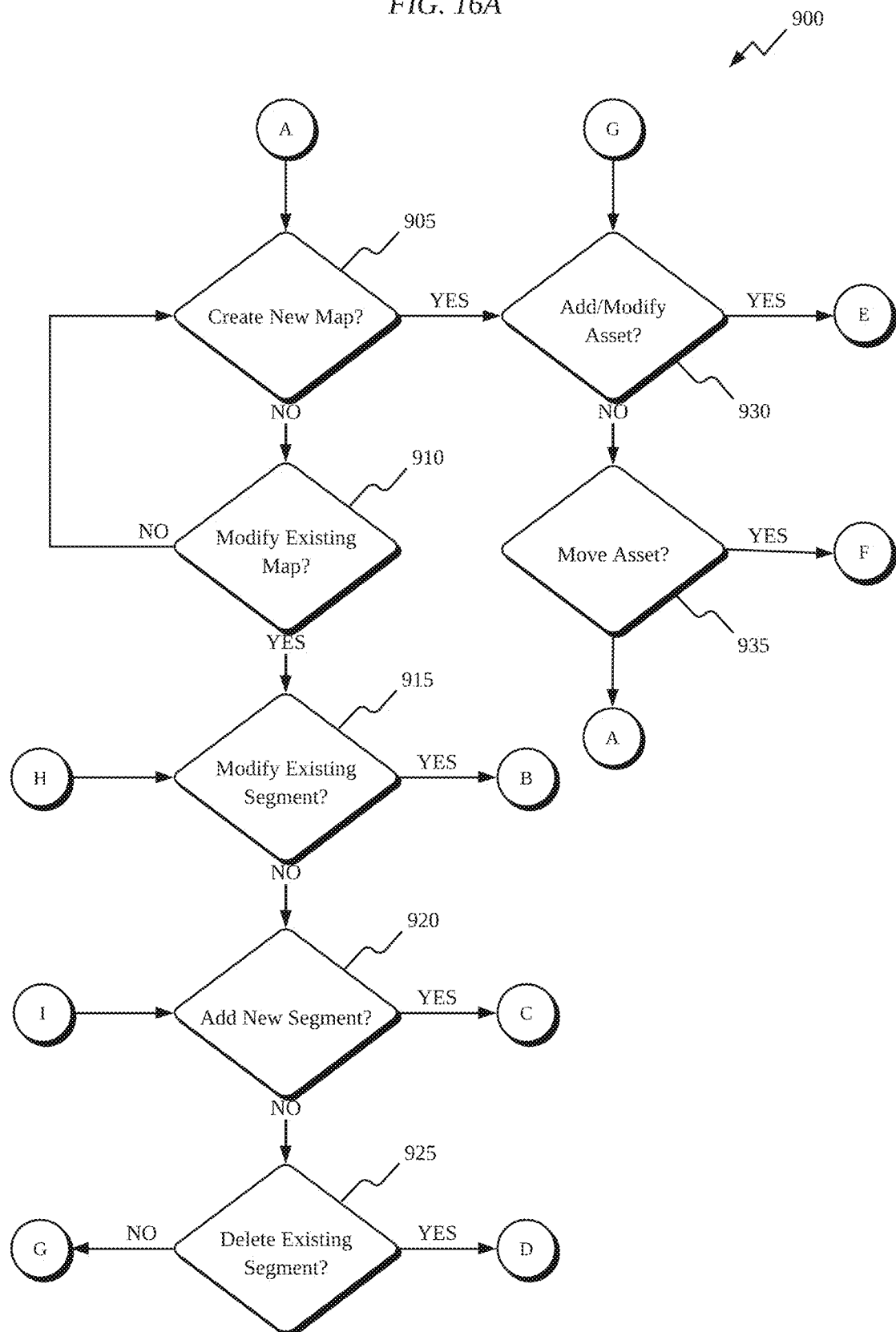
Figure 16E:
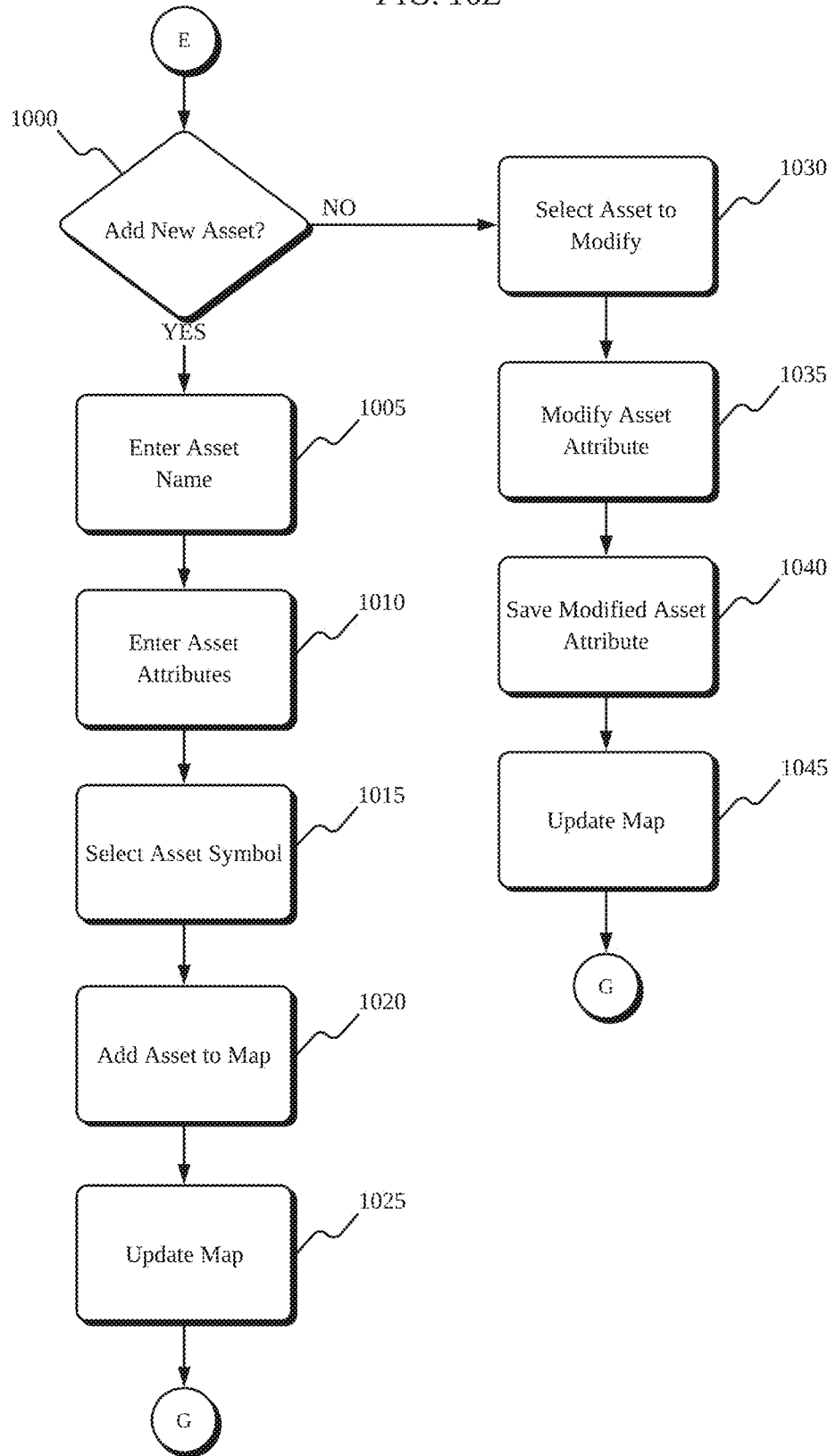
Figure 16F:
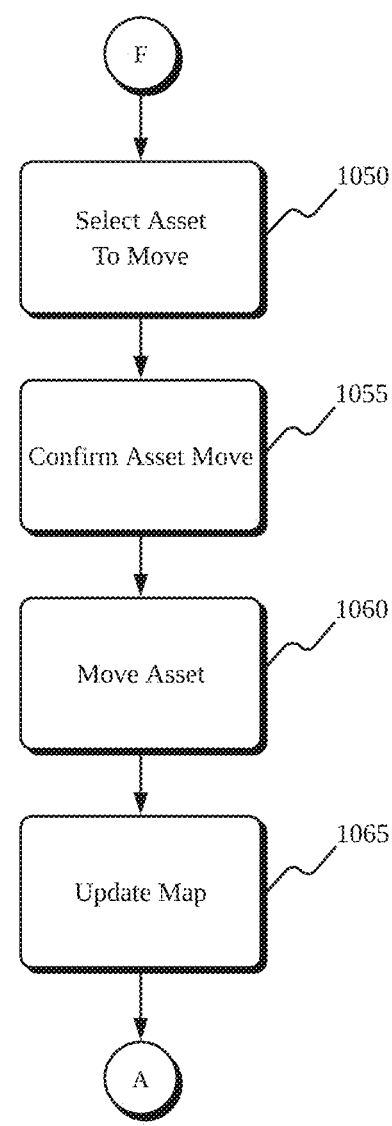

With reference to FIG. 16B and control section B of the process 900, the controller 200, 300 determined that an existing segment of a dynamic data map requires modification. At step 940, the controller 200, 300 determines which segment and which of the segments attributes requires modification. After the segment and attribute have been selected, the segment attribute is modified (step 945) and the modified segment attribute is saved (step 950). The modified segment attribute can be saved to, for example, the memory 220, 330. After the modifications to the segment attribute have been made and saved, the controller 200, 300 updates the dynamic data map with the modified segment attribute (step 955). Following step 955, the process 900 proceeds to control section H and FIG. 16A.

With reference to FIG. 16C and control section C of the process 900, the controller 200, 300 determined that a new segment was to be added to the dynamic data map. At step 960, the controller 200, 300 receives information related to a name for the new segment of the map. The controller 200, 300 receives the information from, for example, the user interface 160, 315. After the segment has been named, the attributes of the new segment are selected (step 965) and the new segment of the dynamic data map is saved (step 970). The new segment and its attribute(s) can be saved to, for example, the memory 220, 330. After the new segment and its attributes have been saved, the controller 200, 300 updates the dynamic data map with the new segment (step 975). Following step 975, the process 900 proceeds to control section I and FIG. 16A.

With reference to FIG. 16D and control section D of the process 900, the controller 200, 300 determined that an existing segment was to be deleted from the dynamic data map. At step 980, the controller 200, 300 receives information related to which existing segment of the dynamic data map is to be deleted. The controller 200, 300 receives the information from, for example, the user interface 160, 315. After the information related to which existing segment of the map is to be deleted, the controller 200, 300 confirms (e.g., by prompting a user for confirmation) that the selected segment is to be deleted (step 985). After the controller 200, 300 receives confirmation of the segment to be deleted, the segment is deleted from the dynamic data map (step 990). The controller 200, 300 then updates the dynamic data map with the deleted segment removed from the dynamic data map (step 995). Deleting a segment and/or asset(s) from a dynamic data map correspondingly removes the data related to that segment and/or asset(s) from a data set being used to populate the dynamic data map. In some embodiments, such a deletion corresponds to the removal of data from a parent or master data set. In other embodiments, the deleted data is removed from a subset of the parent or master data set that was generated by the controller 200, 300 but that data remains in the parent or master data set. For example, a parent or master data set can be maintained by the controller 200 in the server 145. The parent or master data set is provided to the controller 300 of a client-side device 105-125. Modifications, including deletions of data, are made on the data set received by the client-side device 105-125. After the data set has been modified, the modified data set can be used to overwrite the parent or master data set at the server 145 or can be saved at the server 145 as a new data set. The new data set can then, for example, be designated as a new parent or master data set for a dynamic data map that can be separately accessed and modified by a user. Following step 995, the process 900 proceeds to control section G and FIG. 16A.

As described above, in control section G of the process 900, the controller 200, 300 determines whether an asset is to be added to a dynamic data map, an existing asset in the dynamic data map is to be modified, or if an existing asset in a dynamic data map is to be moved to a new or different position in the dynamic data map. If an asset is to be added or modified, the process 900 proceeds to control section E and FIG. 16E. With reference to control section E and FIG. 16E, the controller 200, 300 determines whether a new asset is to be added to a dynamic data map (step 1000). If, at step 1000, a new asset is to be added to the dynamic data map, the controller 200, 300 creates an asset data item to be added to a data set (e.g., a master or parent data set for the dynamic data map). The controller 200, 300 enters an asset name for the new asset in the data set (step 1005), enters asset attributes for the new asset in the data set (step 1010), and selects a symbol for the new asset in the data set (step 1015). The controller 200, 300 enters this information for the new asset based on, for example, information received through the user interface 160, 315. As described herein, a new asset can also be imported, searched and added, uploaded, predicted, etc., and does not strictly require that a user manually enter all information for a new asset. After all of the information for the new asset has been entered, the controller 200, 300 adds the new asset data to the data set for the dynamic data map (step 1020) and updates the dynamic data map with the new asset (step 1025).

If, at step 1000, an existing asset is to be modified (rather than a new asset being added), the controller 200, 300 selects an asset to modify (step 1030). The controller 200, 300 receives information related to which existing asset of the dynamic data map is to be modified from, for example, the user interface 160, 315. After the asset to be modified is selected, the controller 200, 300 modifies one or more attributes of the asset (step 1035). The controller 200, 300 receives information related to how to modify the existing asset of the dynamic data map from, for example, the user interface 160, 315. After modification, the controller 200, 300 saves the modified asset attributes to the data set for the dynamic data map (step 1040) and updates the dynamic data map with the modified asset attribute (step 1045). Following step 1045, the process 900 returns to control section G and FIG. 16A.

Returning to control section G of the process 900, and assuming that no new assets need to be added or existing assets need to be modified, the controller 200, 300 determines whether an existing asset in a dynamic data map is to be moved (step 935). If no existing assets in the dynamic data map need to be moved, the process 900 returns to control section A and step 905. If an existing asset in the dynamic data map is to be moved, the process 900 proceeds to control section F and FIG. 16F. With reference to control section F and FIG. 16F, the controller 200, 300 selects an asset to move (step 1050). The controller 200, 300 receives information related to which existing asset of the dynamic data map is to be moved from, for example, the user interface 160, 315. After the information related to which existing asset of the map is to be moved, the controller 200, 300 confirms (e.g., by prompting a user for confirmation) that the selected asset is to be moved (step 1055). After the controller 200, 300 receives confirmation of the asset to be moved, the asset is moved to a new or different location in the dynamic data map (step 1060). The controller 200, 300 then updates the dynamic data map with the asset moved to the new or different location in the dynamic data map (step 1065). Moving the asset to a new or different location in the dynamic data map results in, for example, the controller 200, 300 modifying associations of the asset within the data set for the dynamic data map. For example, the associations for the asset with respect to its segment within the map, higher-level segments within the map, and lower-level segments can all be updated to reflect the new position of the asset within the dynamic data map and within the hierarchical structure of the data set. Following step 1065, the process 900 returns to control section A and FIG. 16A.

Figure 17:
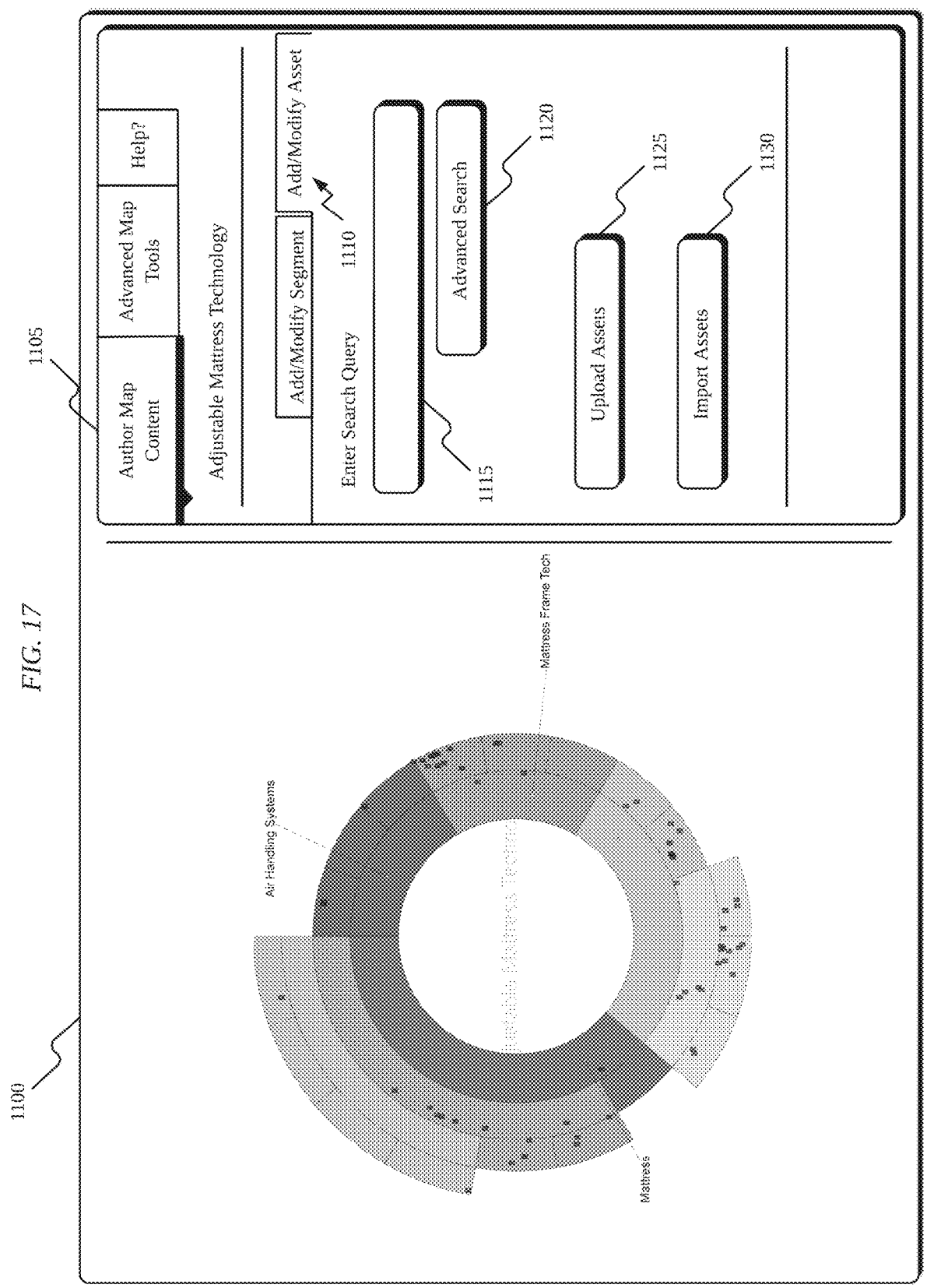
FIG. 17 illustrates a client-side dynamic mapping interface for adding assets to a map by searching for assets, uploading assets, or importing assets.

FIG. 17 illustrates a client-side dynamic data mapping interface 1100 for adding assets to a dynamic data map. An author content tab 1105 provides a variety of mechanisms for adding assets to a new or existing dynamic data map. Within the author content tab 1105 is an add/modify asset sub-tab 1110. The add/modify asset sub-tab 1110 in FIG. 17 provides three primary mechanisms for adding assets to a dynamic data map. The mechanisms include using a search query box 1115 with optional advanced search options 1120, an uploading assets interface 1125, and an import assets interface 1130. The search query box 1115 is operable or configured to receive inputs from a user related to a search query. The search query can be entered using, for example, natural language text searching, Boolean searching, etc. In some embodiments, the box 1115 functions like a patent search database where further values, such as patent classifications, specific patent numbers, assignee names, inventor names, etc. can be entered. Such search fields can be populated in the box 1115 or using the advanced search options 1120. The search capabilities of the add/modify asset sub-tab 1110 are generally well-known in the art and do not need to be described in great detail. The interface 1100 differs significantly from the art, however, after the search results have been retrieved and some or all of the results are subsequently added to a data set for a dynamic data map. Similarly, data assets can be added to a new or existing dynamic data map by uploading a file that contains data assets and attributes or information about the data assets using the upload assets interface 1125. The upload assets interface 1125 functions similar to a conventional uploading interface in which a user is prompted to select a file (e.g., a spreadsheet) from a local computer, a networked computer, or some other storage device where the file is actually stored. Additionally, assets can be added to a new or existing dynamic data map by importing data assets using the import assets interface 1130. The import assets interface 1130 functions similarly to the upload assets interface 1125. However, rather than prompting a user for a specific file to upload, the user may be prompted to provide a web address, a link to an existing dynamic data map, etc. Like adding assets via search query, after data assets have been retrieved by uploading or importing, some or all of the data assets are subsequently added to a data set for a dynamic data map.

Figure 18:
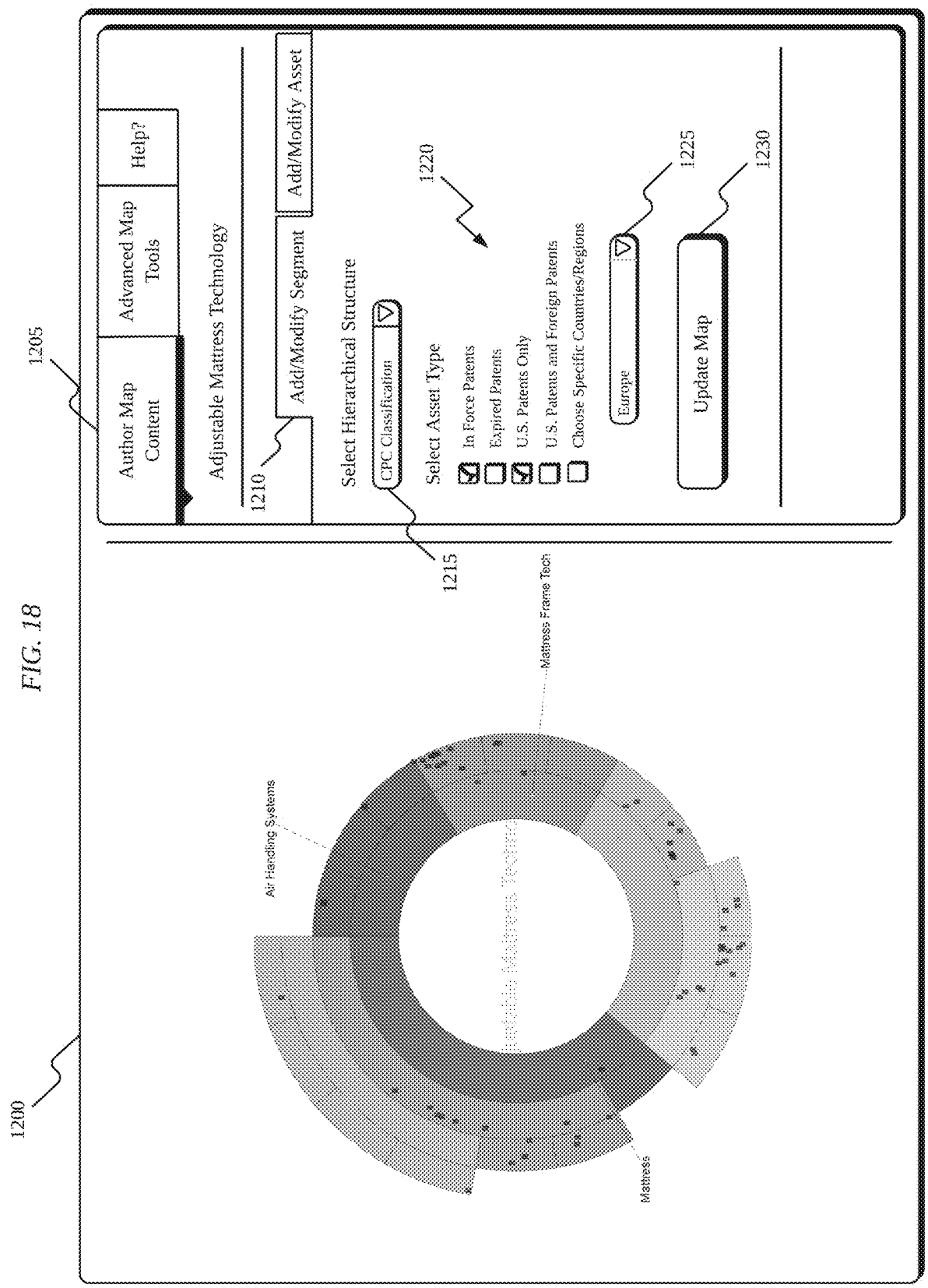
FIG. 18 illustrates a client-side dynamic mapping interface for adding segments and assets to a map by selecting a hierarchical structure and characteristics of the hierarchical structure.

FIG. 18 illustrates another client-side dynamic data mapping interface 1200 for adding segments and/or assets to a dynamic data map. The interface 1200 is specific to an embodiment of the invention in which some or all of the data assets in a dynamic data map are or will be patent-related assets (e.g., issued patents, patent applications, etc.). The interface 1200 includes an author map content tab 1205 and an add/modify segment sub-tab 1210. Although using the add/modify segment sub-tab, the interface 1200 can also add assets by virtue of adding segments to a dynamic data map. For example, although segments can be added, the segments are not necessarily empty (i.e., simply a hierarchical structure that includes no data assets). Rather the segments can include data assets (e.g., patents) that are added to a dynamic data map by virtue of adding a segment within which the data assets are located. The add/modify segment sub-tab 1210 includes an input device (e.g., a drop down menu or similar selection device) for selecting a hierarchical structure for the segments to be added to the dynamic data map. The hierarchical structure can be defined by, for example, patent classification systems such as Cooperative Patent Classification codes, Derwent Classification codes, International Patent Classification codes, United States Patent Classification codes, European Patent Office Classification codes, etc. In some embodiments, a known classification system is not used and an ad hoc hierarchical structure can be created and used. After a hierarchical structure has been selected, a select asset type interface 1220 allows a user to select specific types of assets to effectively filter out some of the data assets that would otherwise be added to the dynamic data map. In the illustrated embodiment, asset types include in force patents, expired patents, U.S. patents, U.S. Patents and foreign patents, and regional patents. Specific regions can be selected with an input device 1225 (e.g., a drop down menu). Additionally, the interface 1200 can also include a search box similar to the search box 1115 and advanced searching option to refine the number of patent data assets that are added to the dynamic data map. After the desired patent data segments and data assets have been selected, the dynamic data map is updated with the selected segments and data assets.

FIGS. 19A-19E are a process 1300 for adding segments and/or assets to a dynamic data map. The process 1300 allows the controller 200, 300 to add multiple segments and/or assets without requiring a user to individually, manually add each segment and/or asset. The process 1300 is capable of being executed by the controller 200 of the server 145 or the controller 300 of the client-side devices 105-125. In some embodiments, the execution of the process 1300 is divided between the controller 200 and the controller 300 such that some steps of performed by the server 145 (e.g., updating a parent or master data set) and other steps are performed by the client-side devices 105-125 (e.g., updating a parent or master data set, selecting segments and/or assets to upload or import, etc.). The computer readable instructions required to execute the process 1300 are stored in the respective non-transitory computer readable data storage mediums (e.g., memory 220, memory 330, etc.) associated with the server 145 and the client-side devices 105-125. The process 1300 is illustrated in FIGS. 19A-19E in an illustrative manner, and the process 1300 can include additional, different, or fewer steps. In some embodiments, the steps of the process 1300 can be executed in an order other than the specific order in which the steps of the process 1300 are illustrated in FIGS. 19A-19E.

The process 1300 begins with the controller 200, 300 determining whether a new dynamic data map is to be created or an existing dynamic data map is to be modified (step 1305). If no new dynamic data map is to be created or no existing dynamic data map is to be modified, the process 1300 returns to step 1305. If, at step 1305, a new dynamic data map is to be created or an existing dynamic data map is to be modified, the process 1300 proceeds to step 1310 and the controller 200, 300 determines the manner(s) in which data will be added to a data set for the dynamic data map. First, at step 1310, the controller 200, 300 determines whether data will be added to a data set using a search query. Data can be added using a search query as previously described above with respect to FIGS. 17 and 18, and will also be described in further detail below. If, at step 1310, the controller 200, 300 determines that data is to be added to a data set using a search query, the process 1300 proceeds to control section J and FIG. 19B. If, at step 1310, the controller 200, 300 determines that data is not to be entered using a search query, the controller 200, 300 determines whether data is to be added to a data set via upload (step 1315). Data can be added via upload as previously described above with respect to FIG. 17, and will also be described in further detail below. If, at step 1315, the controller 200, 300 determines that data is to be added to a data set via upload, the process 1300 proceeds to control section K and FIG. 19C. If, at step 1315, the controller 200, 300 determines that data is not to be entered via upload, the controller 200, 300 determines whether data is to be added to a data set by importation (step 1320). Data can be added using by importation as previously described above with respect to FIG. 17, and will also be described in further detail below. If, at step 1320, the controller 200, 300 determines that data is to be added to a data set by importation, the process 1300 proceeds to control section L and FIG. 19D. If, at step 1320, the controller 200, 300 determines that data is not to be entered by importation, the controller 200, 300 determines whether any data that is to be added to a dynamic data map is to be, or has been filtered (step 1325). Data to be added to a data set for a dynamic data map can be filtered, for example, as described above with respect to FIG. 18, and will also be described in further detail below. If, at step 1325, the controller 200, 300 determines that data to be added to the data set is to be filtered, the process 1300 proceeds to control section M and FIG. 19E. If, at step 1325, no data to be added to the data set is to be filtered, the process 1300 returns to control section Q and step 1305.

Figure 19A:
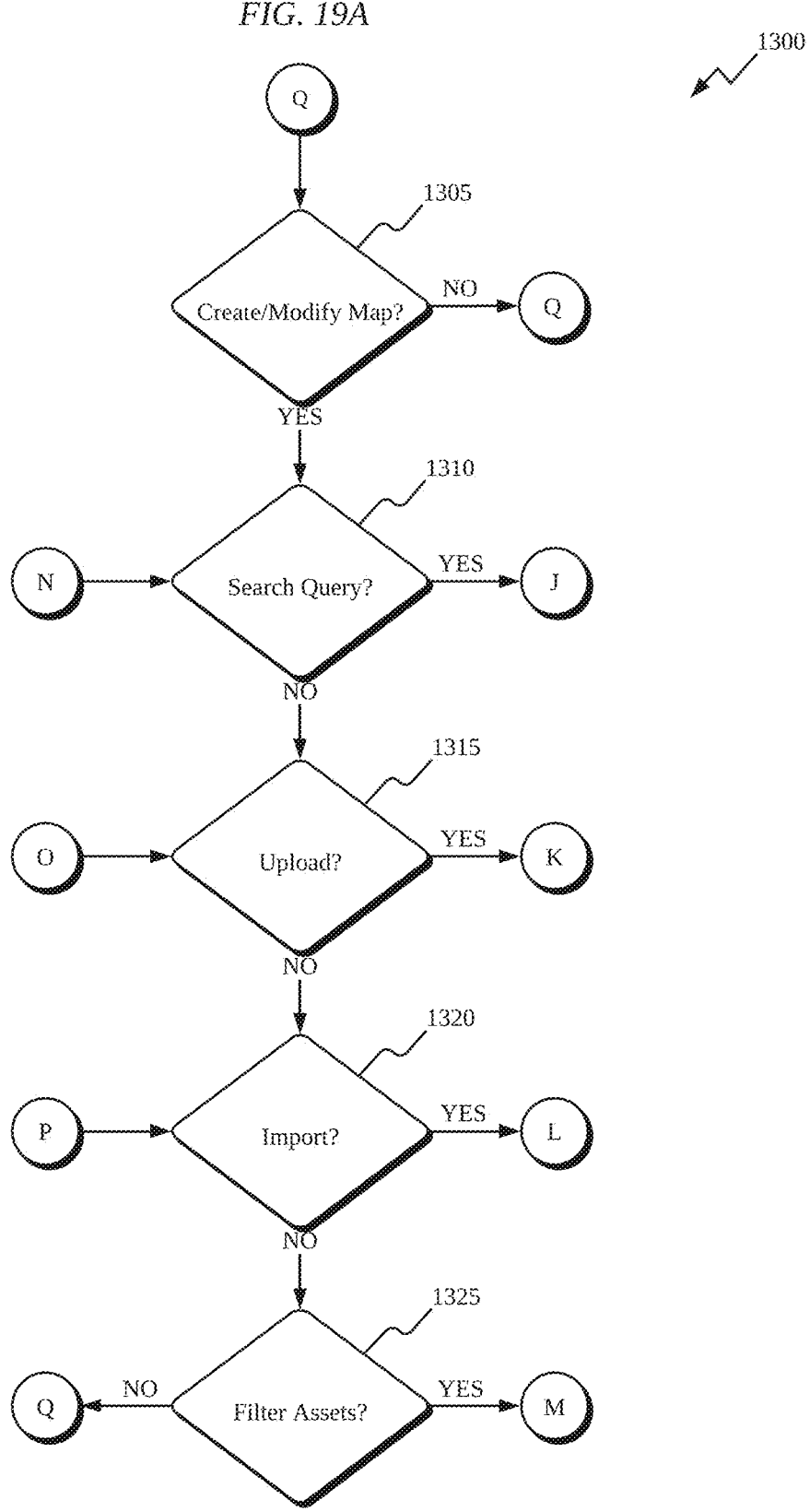
FIGS. 19A-19E are a process for adding segments and assets to a map.
Figures 19B, 19C, 19D, 19E:
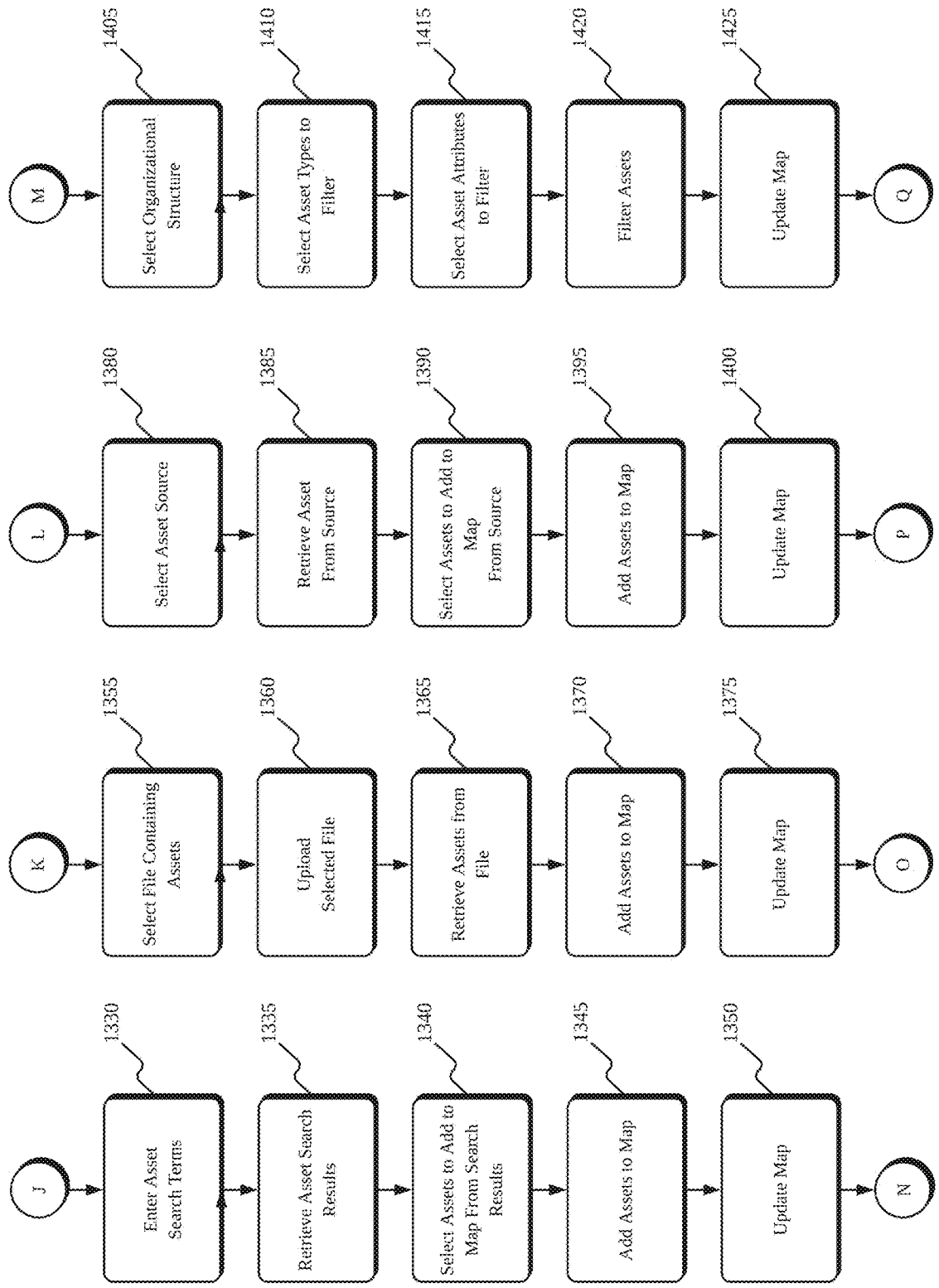

With reference to FIG. 19B and control section J of the process 1300, the controller 200, 300 determined that data is to be added to a data set using a search query. At step 1330, the controller 200, 300 enters asset search terms. Asset search terms can be entered as a string of words or characters. For example, natural language searching or Boolean searching can be used to enter search terms for searching one or more databases of information (e.g., databases 150, 155, third-party computing or storage device 165) for assets to add to the dynamic data map. The databases 150, 155 are, for example, databases for the United States Patent and Trademark Office, the European Patent Office, etc. In some embodiments, the databases 150, 155 correspond to propriety databases of information that are not generally accessible outside of an organization (e.g., a corporation) or government entity. The third-party computing or data storage device 165 is, for example, a server, database, or another device that is accessible via the Internet to the general public for retrieving information. The controller 200, 300 receives the information related to asset search terms from, for example, the user interface 160, 315. After asset search terms have been added at step 1330, asset search results are retrieved from, for example, the databases 150, 155 or device 165. After the assets have been retrieved, all or a portion of the retrieved assets can be selected to be added to a dynamic data map (step 1340). Assets can be selected individually or as a group. For example, the search query can return search results in a structured or spreadsheet like manner that allows individual or groups of assets to be conveniently selected. After the assets to be added to the dynamic data map have been selected at step 1340, the selected assets are added to a data set for the dynamic data map (step 1345) and the controller 200, 300 updates the dynamic data map with the selected assets (step 1350). Following step 1350, the process 1300 proceeds to control section N and FIG. 19A.

With reference to FIG. 19C and control section K of the process 1300, the controller 200, 300 determined that data is to be added to a data set via upload. At step 1355, a file containing assets is selected. The file can be selected, for example, from the memory 330 of the client-side device 105-125, the database 320, or can be received or retrieved through the communication networks 130, 135. The file is, for example, a spreadsheet containing structured data sets or a similar file where information or data can be compiled and saved. After the file has been selected, the controller 200, 300 uploads the selected file (step 1360) and retrieves the assets (and asset related information) from the file (step 1365). After the assets are retrieved from the file, the assets are added to a data set for the dynamic data map (step 1370) and the controller 200, 300 updates the dynamic data map with the uploaded assets (step 1375). Following step 1375, the process 1300 proceeds to control section 0 and FIG. 19A.

With reference to FIG. 19D and control section L of the process 1300, the controller 200, 300 determined that data is to be added to a data set by importation. At step 1380, a source of data assets is selected. The source can be, for example, another data set for another dynamic data map, a publicly available asset list (e.g., from a website), etc. After the source of data assets has been selected, the controller 200, 300 retrieves the data assets from the source (step 1385). After the assets have been retrieved, all or a portion of the retrieved assets can be selected to be added to a dynamic data map (step 1390). The selected assets are then added to a data set for the dynamic data map (step 1395) and the controller 200, 300 updates the dynamic data map with the imported assets (step 1400). Following step 1400, the process 1300 proceeds to control section P and FIG. 19A.

With reference to FIG. 19E and control section M of the process 1300, the controller 200, 300 determined that asset data is to be filtered. In some embodiments, the controller 200, 300 filters data assets after they have been added to a data set of a dynamic data map. Additionally or alternatively, the controller 200, 300 filters data assets before the data assets are added to a data set for a dynamic data map (e.g., at steps 1340, 1365, and/or 1390 of process 1300). Filtering data assets can also be used to create a new dynamic data map for particular types of data assets. For example, from an existing dynamic data map for which there are no new data assets to add, the existing data assets in the dynamic data map can be filtered. The filtered set of data assets (e.g., a subset of a parent or master data set) can be stored as a new parent or master data set corresponding to data assets meeting the selected filter settings. At step 1410, asset types are selected to filter data assets. Asset types correspond to higher level attributes of data assets (e.g., utility patents, issued patents, etc.). The controller 200, 300 then selects asset attributes to be filtered (step 1415). Asset attributes are generally lower-level attributes of data assets (e.g., country/region that issued patent, patent assignee, patent applicant, etc.). After data asset types and asset attributes for filtering are selected, the controller 200, 300 filters the assets (step 1420). The controller 200, 300 then updates (or creates) a dynamic data map with the data assets that remain after filtering (step 1425). Following step 1425, the process 1300 proceeds to control section Q and FIG. 19A.

In addition to creating and/or modifying an existing dynamic data map as described above, the system 100 is also capable of blending existing maps together into a single map. For example, based on permissions within an organization, some users may have access to more data maps than others. As a result, it is beneficial for some users to create and/or modify dynamic data maps and allow another user (e.g., with a higher level of permissions) to combine two or more dynamic data maps into a single dynamic data map. In some embodiments, when two maps are combined, the system 100 (via controller 200, 300) uses the entirety of each of the two maps to create a new combined map. The controller 200, 300 can create new first-level segments for each of the original maps and make the first-level segments of the original maps second-level segments in the combined map. Similar techniques can be used when combining more than two dynamic data maps together into a single dynamic data map.

Figure 20:
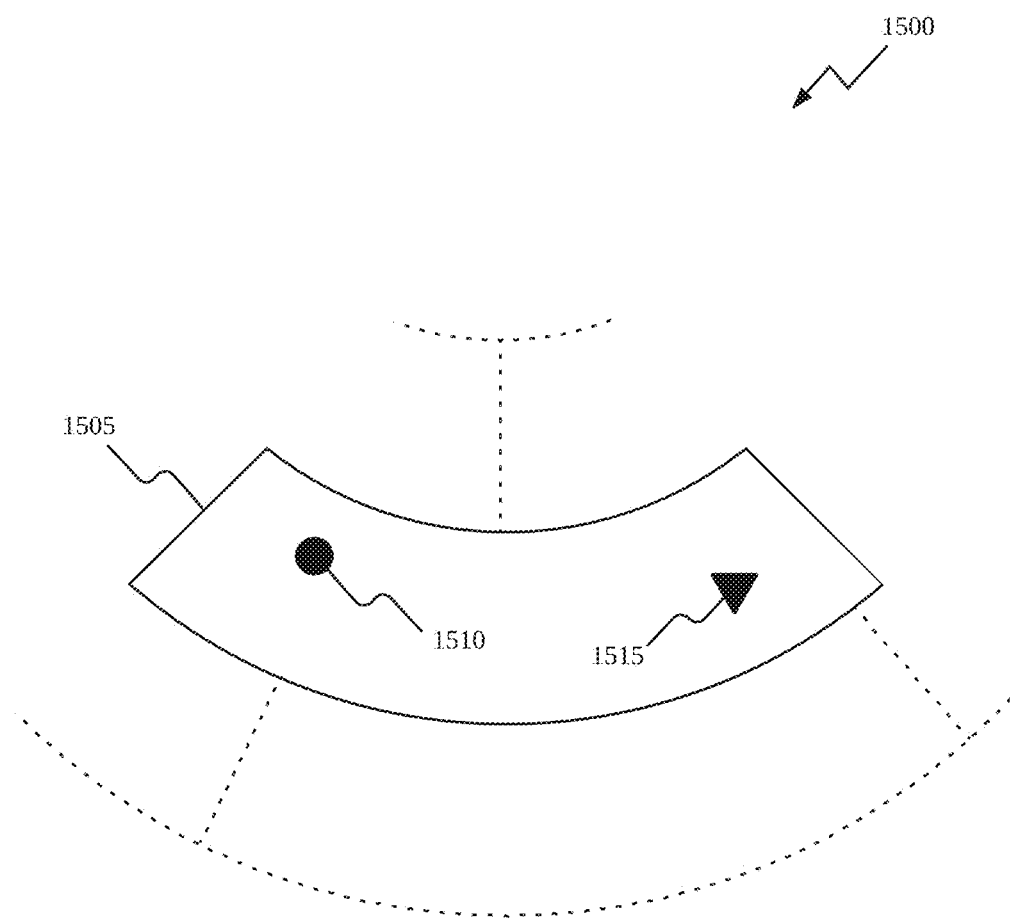
FIG. 20 illustrates a two-dimensional view of an isolated map segment.

FIG. 20 illustrates a zoomed and isolated segment 1505 of a dynamic data map 1500. In addition to being able to view an entire dynamic data map and select segments within the dynamic data map, the controller 200, 300 can also be used to isolate and zoom a particular segment of the map 1500. In some embodiments, the controller 200, 300 can be used to zoom and isolate multiple segments within a dynamic data map. The segment 1505 of FIG. 20 includes two data assets 1510 and 1515. The remaining segments of the dynamic data map 1500 are made invisible or at least partially transparent with respect to the selected segment 1505 to make the segment 1505 the focus of the displayed map. In some embodiments, only the data assets of the selected segment 1505 are visible when a particular segment is isolated and zoomed. As described above, when one or more segments are selected, the data that is loaded into active memory is limited to preserve computational resources of the controller 300. In some embodiments, zooming in on a particular segment of a dynamic data map similarly limits the data loaded into active memory to the data assets related to the zoomed segment.

Figure 21:
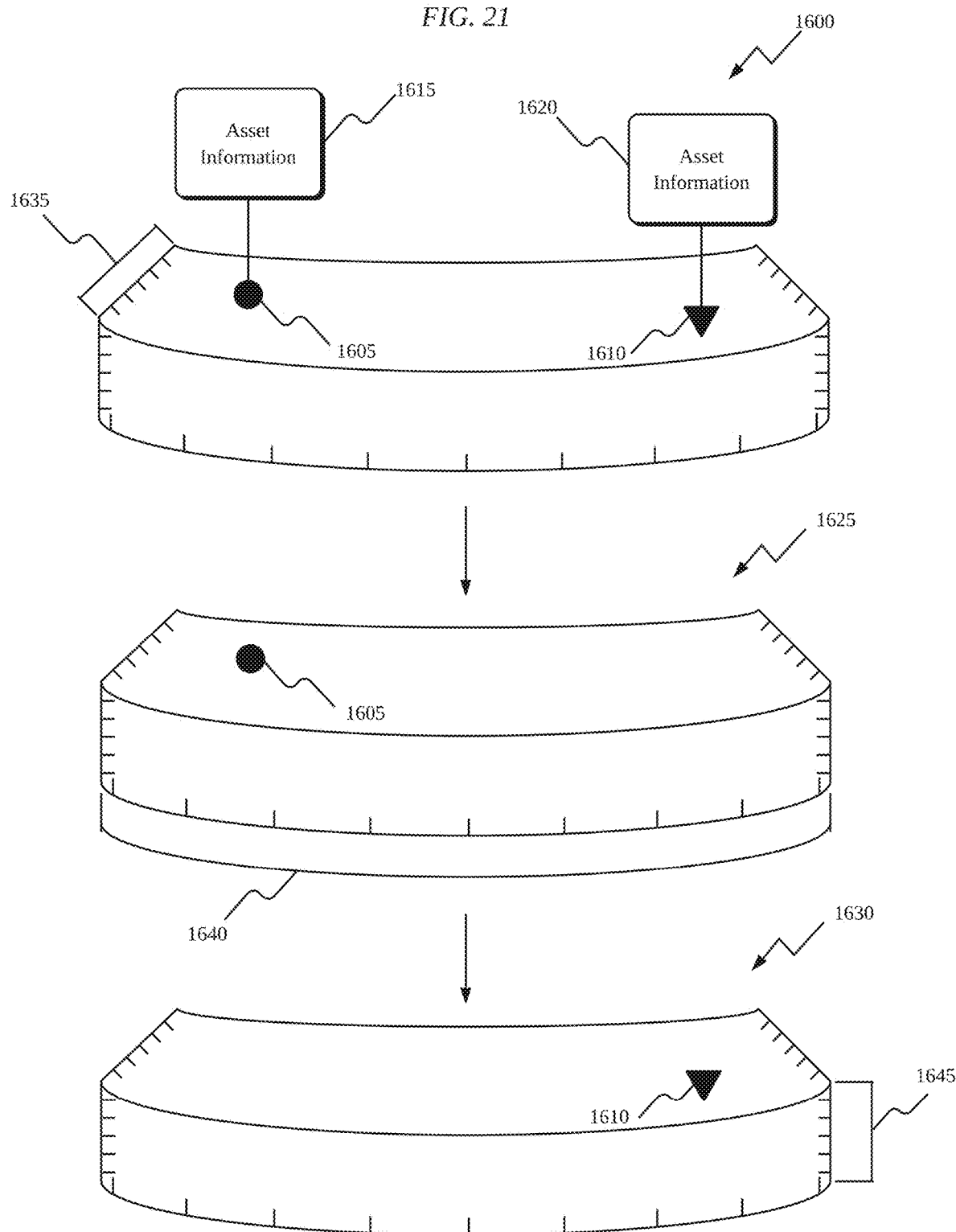
FIG. 21 illustrates a three-dimensional layer view of an isolated map segment.

In addition to the zoomed and isolated segment 1505 of FIG. 20, the controller 200, 300 can also generate a three-dimensional ("3-D") view of a selected segment 1600, as illustrated in FIG. 21. The segment 1600 includes a first data asset 1605 and a second data asset 1610. Included in the display of the segment 1600 is asset information 1615 for the first data asset 1605 and asset information 1620 for the second data asset. The asset information 1615 and asset information 1620 are presented as information boxes extending from their respective data assets. The information boxes can provide information about the data assets (e.g., basic attributes of the data asset). In some embodiments all of the attributes of a given data asset are displayed as asset information. In other embodiments, a subset of the attributes for a data asset is presented in the asset information and a user can select a particular data asset to see additional attributes.

In addition to a three dimensional view of the segment 1600, the controller 200, 300 is also able to separate the segment 1600 into layers to better or more effectively illustrate the data assets in the segment 1600. For example, the controller 200, 300 can separate the segment 1600 into a first segment 1625 including the first data asset 1605 and a second segment 1630 including the second data asset 1610. The controller 200, 300 separates the data assets into layers based on, for example, a particular attribute of the data assets. As an illustrative example, one layer of the segment 1600 can correspond to expired patents and another layer can correspond to in force patents. However, any attribute of the data assets can be used to separate a segment into layers and a user can select specific data assets (i.e., even without a common attribute) and generate a layer that includes the selected assets. Like the two-dimensional representations of segments, the 3-D representation includes a first dimension of information 1635 and a second dimension of information 1640 for the segment 1600. However, because the segment 1600 is illustrated in 3-D, a third dimension of information 1645 can be incorporated into the segment 1600.

Figure 22A:
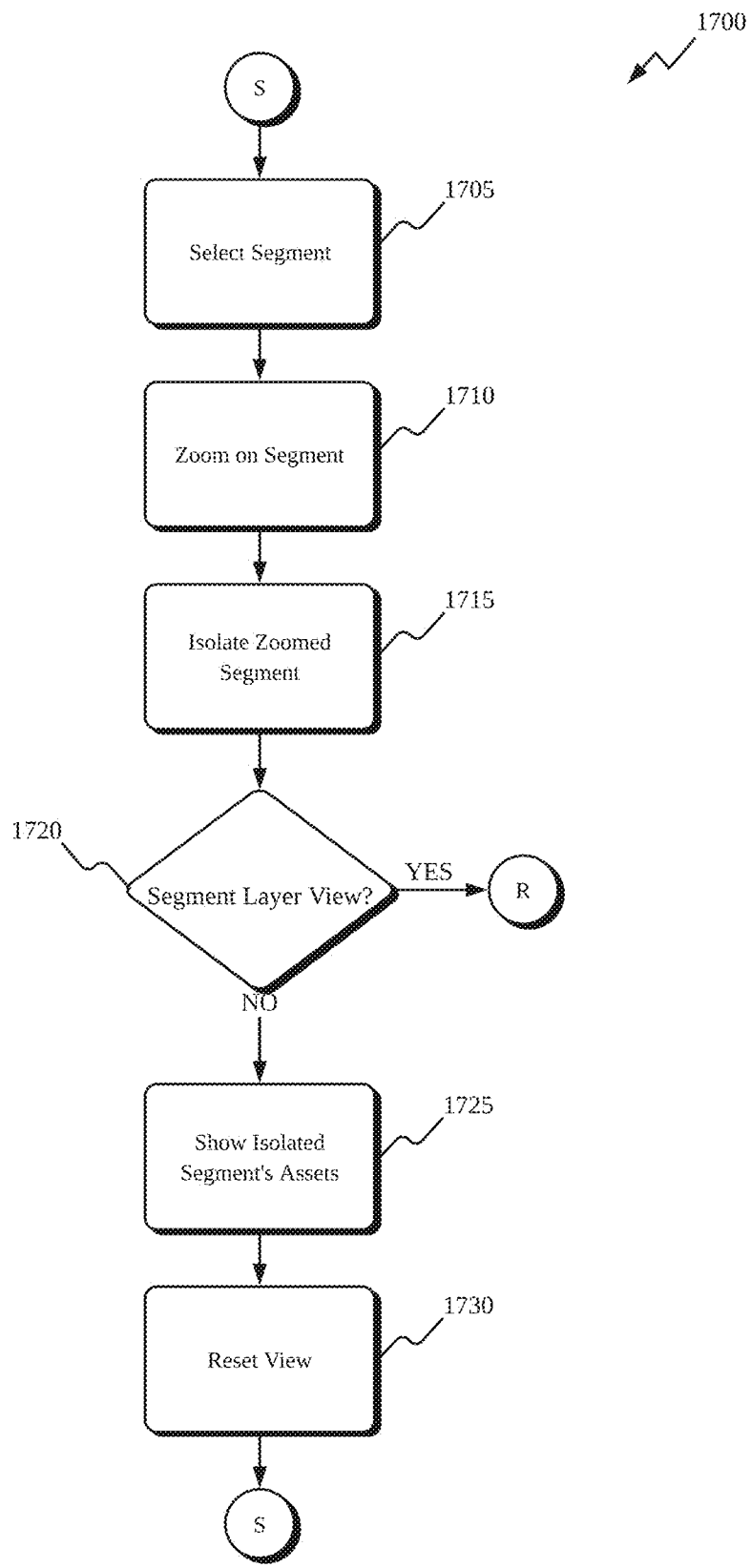
FIGS. 22A-22B are a process for zooming on a map segment, extracting map segment layers, and collapsing segment map layers.
Figure 22B:
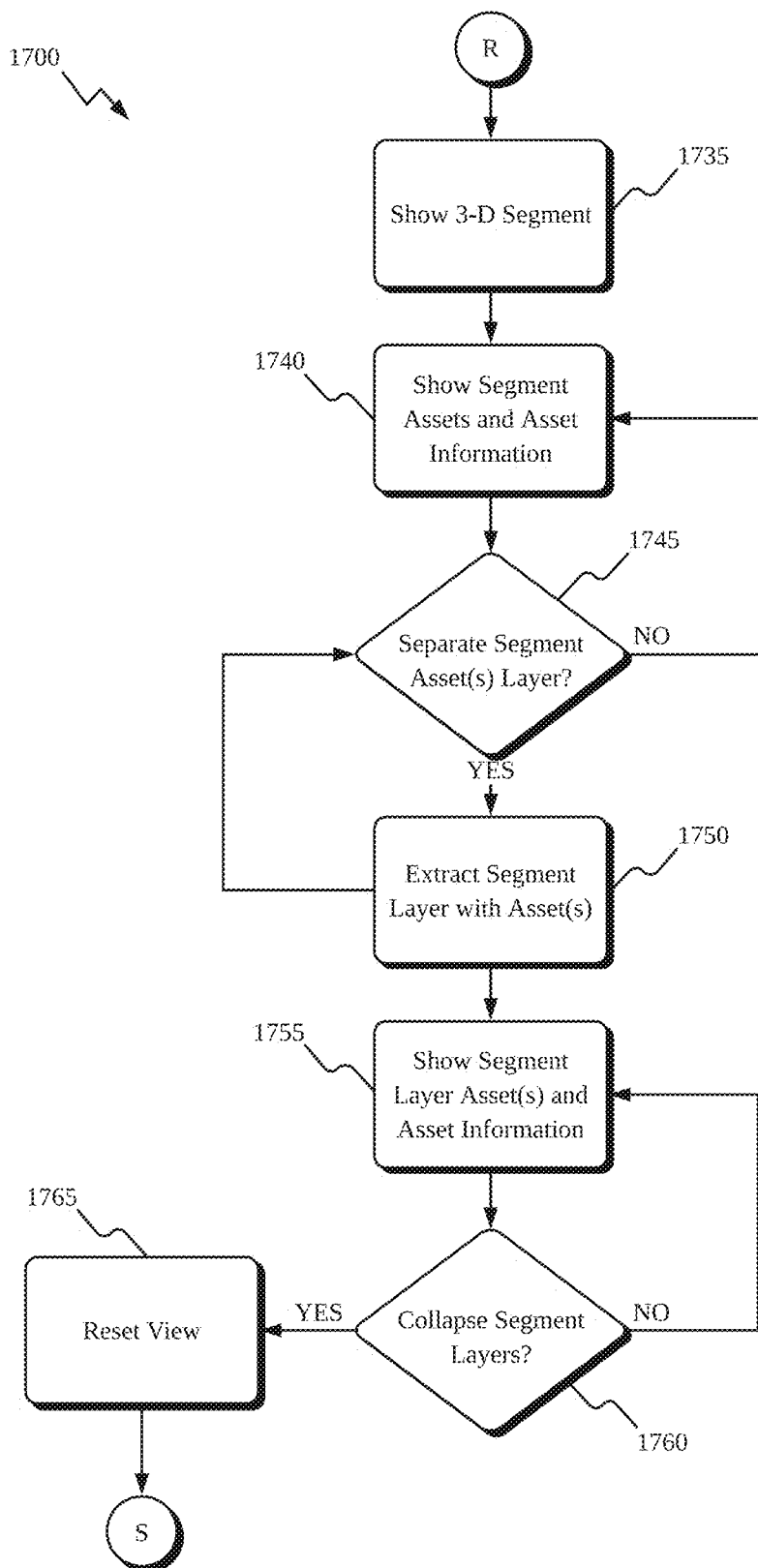

FIGS. 22A-22B are a process 1700 for viewing selected segments within a dynamic data map. The process 1700 allows the controller 200, 300 to zoom in on one or more selected segments, show data assets within the segment(s), separate segments into layers, etc. The process 1700 is capable of being executed by the controller 200 of the server 145 or the controller 300 of the client-side devices 105-125. In some embodiments, the execution of the process 1700 is divided between the controller 200 and the controller 300 such that some steps of performed by the server 145 (e.g., isolating a segment and the segment's data assets, separating segments into layers, etc.) and other steps are performed by the client-side devices 105-125 (e.g., isolating a segment and the segment's data assets, etc.). The computer readable instructions required to execute the process 1700 are stored in the respective non-transitory computer readable data storage mediums (e.g., memory 220, memory 330, etc.) associated with the server 145 and the client-side devices 105-125. The process 1700 is illustrated in FIGS. 22A-22B in an illustrative manner, and the process 1700 can include additional, different, or fewer steps. In some embodiments, the steps of the process 1700 can be executed in an order other than the specific order in which the steps of the process 1700 are illustrated in FIGS. 22A-22B.

The process 1700 begins with the selection of a segment within a dynamic data map by the controller 200, 300 (step 1705). The controller 200, 300 receives information related to which segment of the dynamic data map is to be selected from, for example, the user interface 160, 315. After the controller 200, 300 has selected a segment, the controller 200, 300 adjusts the display of the dynamic data map such that the selected segments are zoomed in on with respect to the other segments of the dynamic data map (step 1710). For example, the selected segment is zoomed and centered in a display portion of the user interface 160, 315. After zooming on the selected segment, the zoomed segment can be isolated from some or all of the other segments of the dynamic data map (step 1715), as illustrated previously with respect to FIG. 20. After the zoomed segment has been isolated, the controller 200, 300 determines whether a segment layer view is to be entered (step 1720). The controller 200, 300 receives information related to entering the segment layer view from, for example, the user interface 160, 315. If the segment layer view is to be entered, the process 1700 proceeds to control section R of process 1700 and FIG. 22B. If the segment layer view is not to be entered, the process 1700 proceeds to step 1725 where the assets of the isolated and zoomed segments are shown within the segment. In some embodiments, the asset shapes, basic asset attributes, or the like are illustrated within the isolated segment view without a user having to scroll over or individually select an asset. After a given time period, after a new segment is selected, after a reset button is selected, etc., the isolated segment view is reset to a normal view of the dynamic data map (step 1730). The process 1700 then proceeds to control section S and step 1705.

If, at step 1720, the segment layer view was selected, the process 1700 proceeds to control section R and FIG. 22B. With reference to control section R and FIG. 22B, a 3-Dimensional ("3-D") segment view is illustrated (step 1735). The 3-D segment view is illustrated in FIG. 21. In the 3-D segment view, assets and asset attributes or information is shown (step 1740). When the 3-D segment view is active, the controller 200, 300 can separate the segment into asset layers, as previously illustrated in FIG. 22B (step 1745). If, at step 1745, the segment layer view is not selected, the 3-D segment view (e.g., showing a single segment layer) remains. However, if the segment layer view is selected, the controller 200, 300 extracts segment layers based on, for example, asset attributes (step 1750). Step 1750 can be repeated multiple times automatically by the controller 200, 300 or by command of a user to continue to extract asset layers from the 3-D segment. After each segment layer is extracted, the assets in each segment layer are respectively shown along with asset attributes or information. The segment layer view and 3-D segment view are particularly beneficial when viewing a segment that includes a significant number (e.g., greater than 20) assets because the views are able to provide a less cluttered visual display and individual asset information without requiring a user to scroll over or individually select an asset. After a given time period, after a new segment is selected, after a reset button is selected, etc. (step 1760), the segment layer view is collapsed and the view is reset to a normal view of the dynamic data map (step 1765). The process 1700 then proceeds to control section S and step 1705.

Figure 23:
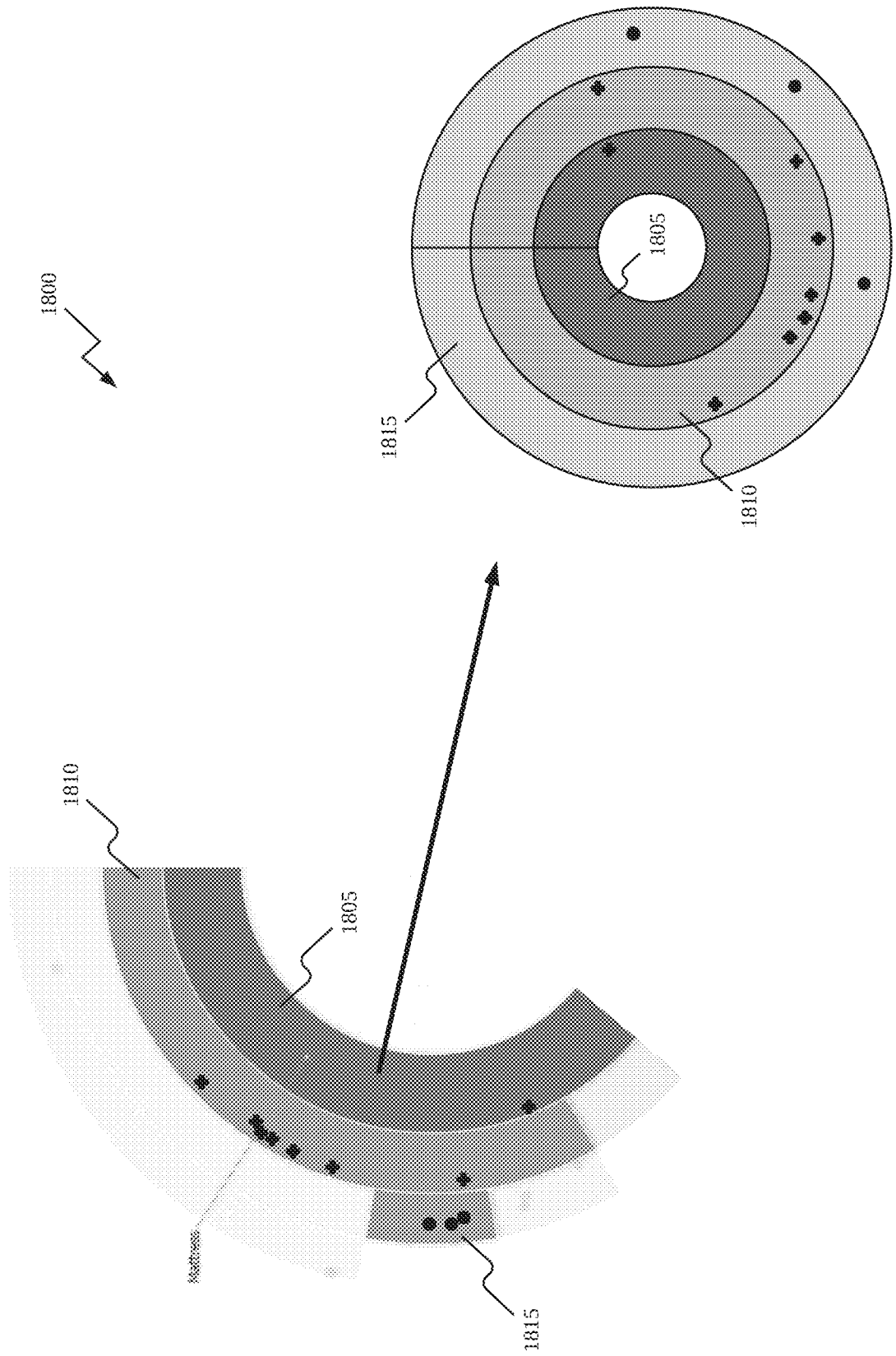
FIG. 23 illustrates the generation of a new map based on one or more selected map segments.

In addition to adding segments and/or assets to a dynamic data map as was described above, existing segments and data assets within a dynamic data map can also be used to generate a new dynamic data map. For example, FIG. 23 illustrates the creation of a dynamic data map from one or more segments in an existing dynamic data map. A group of segments 1800 in an existing dynamic data map includes three levels of segments. The group 1800 includes a first-level segment 1805, a second-level segment 1810, and a third-level segment 1815. When the controller 200, 300 determines that a new dynamic data map is to be created (e.g., based on inputs from user interface 160, 315), the group 1800 is used to populate the new dynamic data map. As illustrated in FIG. 23, the new dynamic data map includes the same segments 1805, 1810, and 1815. Because only one segment was selected from each of the first, second, and third segment levels, each segment in the new dynamic data map corresponds to a full circle. If additional segments were selected (e.g., an additional segment at any layer), the corresponding level of the new dynamic data map is proportionally broken up between the selected segments (e.g., one-half of the circle for each of two segments). For each of the selected segments of the original dynamic data map that becomes a new segment in the new dynamic data map, the data assets that were present in the original selected data segment are copied and/or transferred to the corresponding segments of the new dynamic data map. The data assets that are copied and/or transferred to the new dynamic data map are positioned in the segments of the new dynamic data map based on their attributes from the original dynamic data map (e.g., importance, age, etc.) to convey the same dimensions of information.

Figure 24:
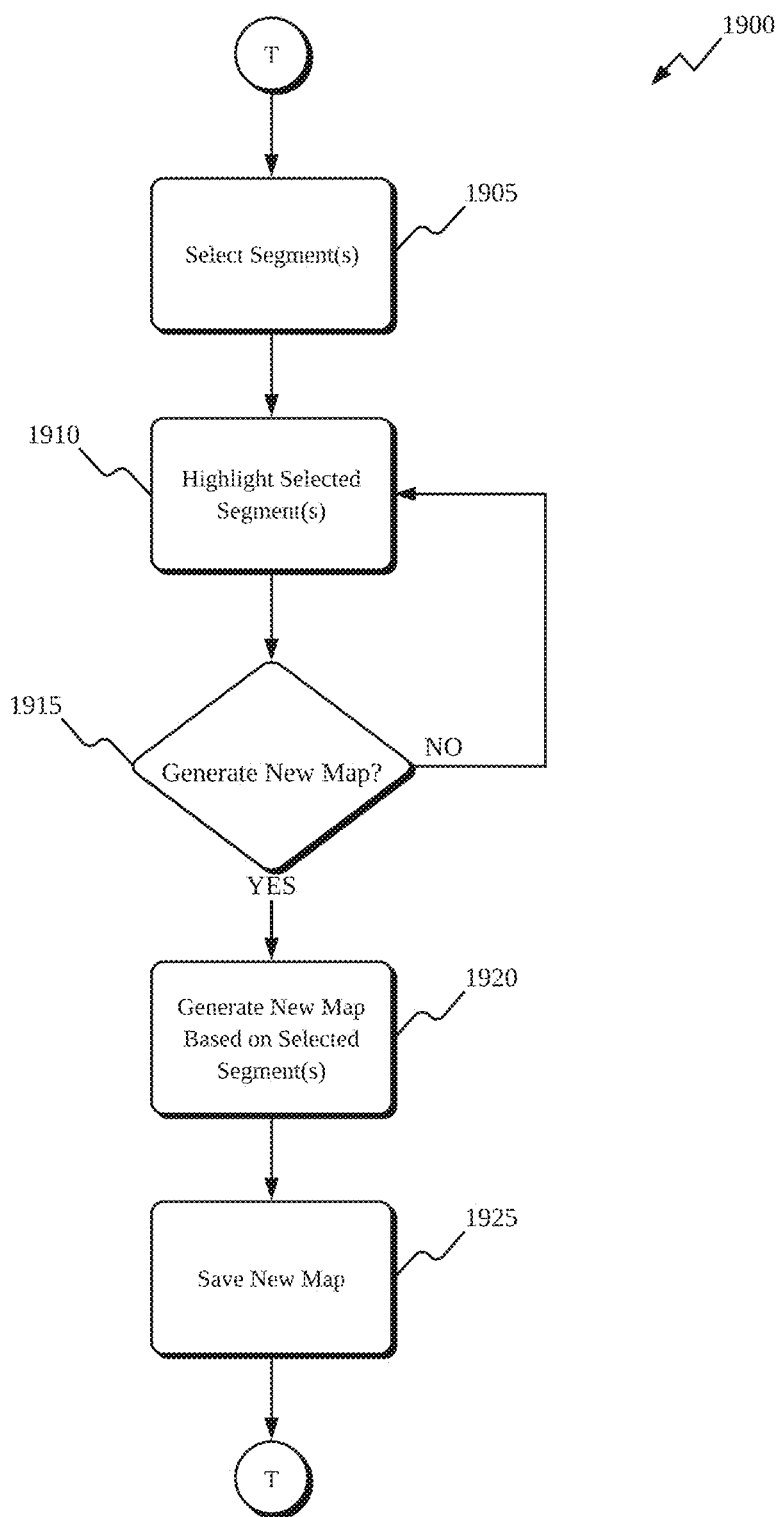
FIG. 24 is a process for generating a new map based one or more selected map segments.

FIG. 24 is a process 1900 by which the controller 200, 300 generates a new dynamic data map from one or more selected segments of an existing dynamic data map. The process 1900 is capable of being executed by the controller 200 of the server 145 or the controller 300 of the client-side devices 105-125. In some embodiments, the execution of the process 1900 is divided between the controller 200 and the controller 300 such that some steps of performed by the server 145 (e.g., generating a new dynamic data map, etc.) and other steps are performed by the client-side devices 105-125 (e.g., selecting segments, etc.). The computer readable instructions required to execute the process 1900 are stored in the respective non-transitory computer readable data storage mediums (e.g., memory 220, memory 330, etc.) associated with the server 145 and the client-side devices 105-125. The process 1900 is illustrated in FIG. 24 in an illustrative manner, and the process 1900 can include additional, different, or fewer steps. In some embodiments, the steps of the process 1900 can be executed in an order other than the specific order in which the steps of the process 1900 are illustrated in FIG. 24.

The process 1900 begins with the selection of one or more segments within an existing dynamic data map by the controller 200, 300 (step 1905). The controller 200, 300 receives information related to which segments of the dynamic data map are to be selected from, for example, the user interface 160, 315. After one or more segments are selected, the selected segments are highlighted (e.g., to distinguish selected segments from unselected segments) (step 1910). At step 1915, the controller 200, 300 determines whether a new dynamic data map is to be generated. The controller 200, 300 receives information related to whether to generate a new dynamic data map from, for example, the user interface 160, 315. If, at step 1915, the controller 200, 300 is to generate a new dynamic data map, the controller 200, 300 generates a new dynamic data map based on the selected segments (step 1920), as previously illustrated in FIG. 23. The data assets that were present in the selected segments are copied or moved into the new dynamic data map, and their relative positions within each of the new segments is modified or updated to reflect changes in segment size. After the new dynamic data map is generated, the new dynamic data map and its data sets are saved (step 1925). The new dynamic data map can be saved to, for example, the memory 220, the memory 330, the database 150, the database 155, the database 320, etc. In some embodiments, the new dynamic data map is generated by the controller 300 in a client-side device 105-125 and then transferred to the controller 200 of the server 145 for permanent storage. In other embodiments, the new dynamic data map can be stored in multiple locations, including the server 145. If the new dynamic data map is stored, for example, somewhere other than the server 145 (e.g., database 320), the dynamic data map and its data sets are available to be imported using the process 1300 for creating or modifying a dynamic data map.

Thus, the invention provides, among other things, a data modification and mapping system for the dynamic modification of data sets on both the client side and server side. Various features and advantages of the invention are set forth in the following claims.

What is claimed is:

1. Non-transitory computer-readable medium storing instructions that, when executed by an electronic processor, perform a set of functions, the set of functions comprising:
   receiving, from a server device over a communication network, a data set retrieved from one or more databases, the data set including a plurality of data assets, each of the plurality of data assets including a plurality of attributes;
   generating and displaying a user interface including a data map in a normal view based on the received data set, the normal view of the data map including a plurality of segments, the plurality of segments including a first segment including a plurality of graphical representations positioned within the first segment, each of the plurality of graphical representations associated with one specific data asset of the plurality of data assets and each of the plurality of graphical representations including a plurality of dimensions wherein each dimension is associated with one of the plurality of attributes of the one specific data asset associated with the graphical representation, wherein a first dimension of the plurality of dimensions of each of the plurality of graphical representations includes a position of the graphical representation within the first segment; and
   in response to receiving user input through the user interface, generating and displaying within the user interface the data map in a modified view, the modified view isolating at least a portion of the data map, the portion of the data map including one of the plurality of graphical representations or at least one of the plurality of segments, the isolated portion of the data map displayed in a different form compared to other graphical representations of the plurality of graphical representations or other segments of the plurality of segments on the data map.

2. The non-transitory computer readable medium of claim 1, wherein the user input includes a selection of one of the plurality of segments and wherein the isolated section of the data map includes the selected one of the plurality of segments displayed in a different form compared to other segments of the plurality of segments.

3. The non-transitory computer readable medium of claim 1, wherein the user input includes a selection of one of the plurality of segments and wherein the isolated section of the data map includes the selected one of the plurality of segments displayed with asset information for each of a subset of the plurality of data assets represented within the selected one of the plurality of assets.

4. The non-transitory computer readable medium of claim 1, wherein the user input includes a selection of one of the plurality of graphical representations and wherein the isolated section of the data map includes asset information displayed for a specific one of the plurality of data assets represented by the selected one of the plurality of graphical representation.

5. The non-transitory computer readable medium of claim 1, wherein the user input includes a filtering setting and wherein the isolated section of the data map includes a subset of the plurality of graphical representing a subset of the plurality of assets meeting the filtering settings.

6. The non-transitory computer readable medium of claim 1, wherein the user input includes a zoom input and wherein the isolated section of the data map includes a zoomed in view of at least one of the plurality of segments.

7. The non-transitory computer readable medium of claim 6, wherein, in response to receiving the user input, other segments of the plurality of segments in the data map are displayed invisible or at least partially transparent in the isolated view.

8. The non-transitory computer readable medium of claim 1, wherein the user input includes a three-dimensional view input and wherein the isolated section of the data map includes a three-dimensional view of at least one of the plurality of segments.

9. The non-transitory computer readable medium of claim 8, wherein the three-dimensional view of the at least one of the plurality of segments includes asset information for each of the plurality of graphical representations included in the at least one of the plurality of segments.

10. The non-transitory computer readable medium of claim 9, wherein the asset information includes an information box extending from each of the plurality of graphical representations included in the at least one of the plurality of segments.

11. The non-transitory computer readable medium of claim 1, wherein the user input includes a layer input and wherein the isolated section of the data map includes at least one of the plurality of segments displayed separated into a plurality of layers.

12. The non-transitory computer readable medium of claim 11, wherein the plurality of layers separate data assets represented by each graphical representations included in the at least one of the plurality of segments based on one of the plurality of attributes.

13. The non-transitory computer readable medium of claim 1, wherein in response to a predetermined time period or receiving second user input, resetting the dynamic map to the normal view.

14. The non-transitory computer-readable medium of claim 1, wherein a second dimension and a third dimension of the three or more dimensions include a shape and a color.

15. The non-transitory computer-readable medium of claim 14, wherein at least one of the shape and the color represents whether the data asset associated with the graphical representation is expired.

16. The non-transitory computer-readable medium of claim 1, wherein the position represents an age of the data asset associated with the graphical representation.

17. The non-transitory computer-readable medium of claim 1, wherein the first dimension includes a radial position within the first segment and wherein a second dimension of plurality of dimensions includes a circumferential position within the first segment.

18. A method for generating a dynamic data map, the method comprising:

receiving, from a server device over a communication network, a data set retrieved from one or more databases, the data set including a plurality of data assets, each of the plurality of data assets including a plurality of attributes;

generating and displaying a user interface including a data map in a normal view based on the received data set, the normal view of the data map including a plurality of segments, the plurality of segments including a first segment including a plurality of graphical representations positioned within the first segment, each of the plurality of graphical representations associated with one specific data asset of the plurality of data assets and each of the plurality of graphical representations including a plurality of dimensions wherein each dimension is associated with one of the plurality of attributes of the one specific data asset associated with the graphical representation, wherein a first dimension of the plurality of dimensions of each of the plurality of graphical representations includes a position of the graphical representation within the first segment; and in response to receiving user input through the user interface, generating and displaying within the user interface the data map in a modified view, the modified view isolating at least a portion of the data map, the portion of the data map including one of the plurality of graphical representations or at least one of the plurality of segments, the isolated portion of the data map displayed in a different form compared to other graphical representations of the plurality of graphical representations or other segments of the plurality of segments on the data map.

19. The method of claim 18, wherein the user input includes a selection of one of the plurality of segments and wherein the isolated section of the data map includes the selected one of the plurality of segments displayed in a different form compared to other segments of the plurality of segments.

20. The method of claim 18, wherein the user input includes a selection of one of the plurality of graphical representations and wherein the isolated section of the data map includes asset information displayed for a specific one of the plurality of data assets represented by the selected one of the plurality of graphical representation.

21. The method of claim 18, wherein the user input includes a filtering setting and wherein the isolated section of the data map includes a subset of the plurality of graphical representing a subset of the plurality of assets meeting the filtering settings.

22. A system for generating a dynamic data map, the system comprising:

a client-side device including a controller and operably connected to a communication network, the controller including a processor and a non-transitory computer readable data storage medium, the processor configured to retrieve from the medium and execute computer readable instructions to:

receive, from a server device over a communication network, a data set retrieved from one or more databases, the data set including a plurality of data assets, each of the plurality of data assets including a plurality of attributes;

generate and display a user interface including a data map in a normal view based on the received data set, the normal view of the data map including a plurality of segments, the plurality of segments including a first segment including a plurality of graphical representations positioned within the first segment, each of the plurality of graphical representations associated with one specific data asset of the plurality of data assets and each of the plurality of graphical representations including a plurality of dimensions wherein each dimension is associated with one of the plurality of attributes of the one specific data asset associated with the graphical representation, wherein a first dimension of the plurality of dimensions of each of the plurality of graphical representations includes a position of the graphical representation within the first segment; and in response to receiving user input through the user interface, generate and display within the user interface the data map in a modified view, the modified view isolating at least a portion of the data map, the portion of the data map including one of the plurality of graphical representations or at least one of the plurality of segments, the isolated portion of the data map displayed in a different form compared to other graphical representations of the plurality of graphical representations or other segments of the plurality of segments on the data map.

23. The system of claim 22, wherein the user input includes a selection of one of the plurality of segments and wherein the isolated section of the data map includes the selected one of the plurality of segments displayed in a different form compared to other segments of the plurality of segments.

24. The system of claim 22, wherein the user input includes a selection of one of the plurality of graphical representations and wherein the isolated section of the data map includes asset information displayed for a specific one of the plurality of data assets represented by the selected one of the plurality of graphical representation.

25. The system of claim 22, wherein the user input includes a zoom input and wherein the isolated section of the data map includes a zoomed in view of at least one of the plurality of segments.

* * * * *